United States Patent [19]
Jacobs et al.

[11] Patent Number: 5,688,464
[45] Date of Patent: Nov. 18, 1997

[54] VIBRATIONALLY ENHANCED STEREOLITHOGRAPHIC RECOATING

[75] Inventors: Paul F. Jacobs, La Crescenta; J. Scot Thompson, Northridge; Hop D. Nguyen, Little Rock; Dennis R. Smalley, Baldwin Park, all of Calif.

[73] Assignee: 3D Systems, Inc., Valencia, Calif.

[21] Appl. No.: 405,812

[22] Filed: Mar. 16, 1995

Related U.S. Application Data

[62] Division of Ser. No. 384,383, Feb. 3, 1995, which is a continuation of Ser. No. 198,655, Feb. 18, 1994, abandoned, which is a continuation of Ser. No. 932,721, Aug. 20, 1992, abandoned, which is a continuation of Ser. No. 495,791, Mar. 19, 1990, abandoned.

[51] Int. Cl.$^6$ .................... B29C 35/08; B29C 41/02
[52] U.S. Cl. .................... 264/401; 264/308; 264/442; 264/443; 264/497; 427/356; 427/358; 427/510; 427/512; 427/554; 427/555; 427/600; 427/601
[58] Field of Search .................... 264/236, 308, 264/401, 442, 443, 497; 156/73.1, 73.6, 272.8, 273.3, 273.5, 275.5, 307.1; 427/346, 356, 358, 510, 512, 554, 555, 600, 601

[56] References Cited

U.S. PATENT DOCUMENTS

| | | | |
|---|---|---|---|
| 1,482,066 | 1/1924 | Curtis | 427/300 |
| 1,976,066 | 10/1934 | Friend | 118/57 |
| 2,657,668 | 11/1953 | Maier | 118/612 |
| 3,254,625 | 6/1966 | Armstrong | 118/612 |
| 3,396,214 | 8/1968 | Crandon | 264/443 X |
| 4,013,807 | 3/1977 | Putney et al. | 427/184 |
| 4,247,508 | 1/1981 | Housholder | 264/219 |
| 4,575,330 | 3/1986 | Hull | 264/401 X |
| 4,658,276 | 4/1987 | Kanda et al. | 503/220 |
| 4,752,352 | 6/1988 | Feygin | 156/272.8 X |
| 5,204,055 | 4/1993 | Sachs et al. | 264/442 X |
| 5,238,614 | 8/1993 | Uchinono et al. | 264/401 |

FOREIGN PATENT DOCUMENTS

| | | | |
|---|---|---|---|
| 62-20861 | 1/1987 | Japan | 427/346 |
| 1191125 | 6/1984 | U.S.S.R. | |

*Primary Examiner*—Leo B. Tentoni
*Attorney, Agent, or Firm*—Dennis R. Smalley

[57] ABSTRACT

Methods and apparatus for providing a vibrational enhancement to the recoating process in stereolithography are disclosed. The formation of a thin layer of building material over a previous layer of structure of a partially completed three-dimensional object, in preparation for formation of an additional layer of structure, is enhanced by the use of vibrational energy imparted to the building medium. In a first preferred apparatus, vibration is induced into the surface of the material by a plurality of vibrating needles that penetrate below the working surface to a sufficient depth to ensure adequate coupling but not deep enough to come into contact with the surface of the partially completed part. In a second preferred apparatus, vibration is coupled directly to the object support. The vibrational energy is then transmitted through the part to the surface of the building material. In a first preferred method the partially completed object is overcoated with material and vibration is used to reduce the coating thickness. In a second preferred method, the partially completed object is under-coated with material and vibration is used to increase the coating thickness.

32 Claims, 10 Drawing Sheets

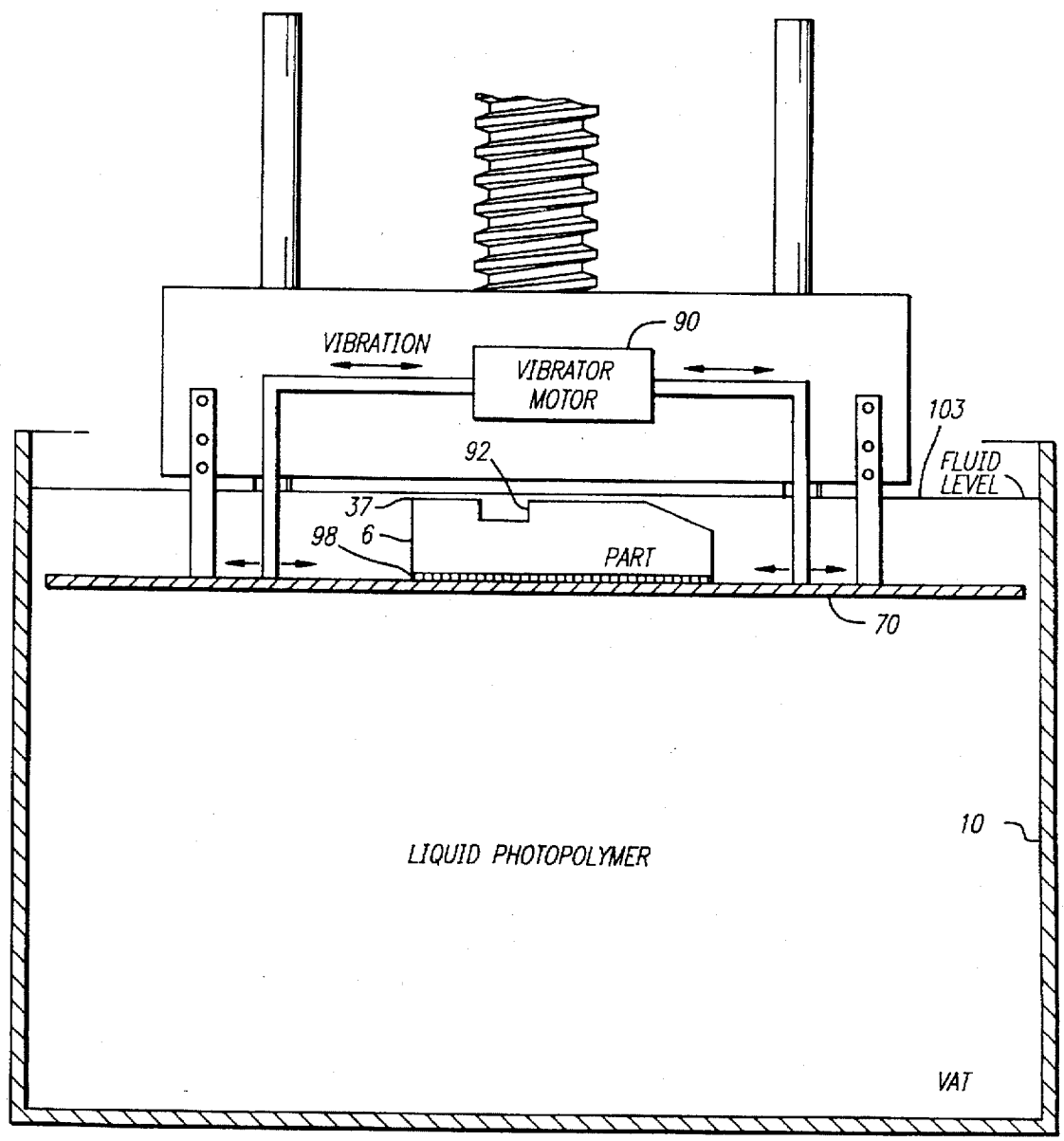

VIBRATIONALLY ENHANCED STEREOLITHOGRAPHIC RECOATING

This application is a divisional of patent application Ser. No. 08/384,383, filed Feb. 3, 1995, now pending; which is a continuation of patent application Ser. No. 08/198,655, filed Feb. 18, 1994, now abandoned; which is a continuation of patent application Ser. No. 07/932,721, filed Aug. 20, 1992, now abandoned; which is a continuation of patent application Ser. No. 07/495,791, filed Mar. 19, 1990, now abandoned.

BACKGROUND OF THE INVENTION

1. Field of the Invention

This invention relates to the field of stereolithography and particularly to means for preparing a surface for curing. More particularly it relates to an improved method and apparatus for creating a thin coating of uncured material of uniform thickness in preparation for creation of a layer of structure of a three dimensional object which is being formed by stereolithographic processes.

The generation of an object ("part") by stereolithographic methods generally involves numerous steps. These include:

1. Generation of data describing a three dimensional part design, for example in a Computer Aided Design (CAD) file or CAT scan file.
2. Transfer of the data file to the host Stereo Lithographic Apparatus (SLA) machine.
3. Software compilation, from the data file, of numerous thin "slices", each describing a cross-section of the part, but having a thickness appropriate to the stereolithographic process.
4. Operation of an appropriate synergistic stimulation device to expose the slice cross-section at the working surface of the uncured building material and thereby initiate an appropriate change in the uncured material. For example, this synergistic stimulation device might be a combined laser, emitting an ultra-violet beam, and an electro-optical scanning system which utilizes servo driven mirrors to scan the ultra-violet beam across the material's working surface by "drawing" the slice cross-section. As an example, an appropriate material for the UV beam to react with is a photopolymer sensitized to the appropriate UV wavelengths. The working surface cited above is the surface of the building material at which the thin layers of structure will be formed on a layer by layer basis to build up a three-dimensional object. It is generally located at a controlled distance from critical components of the apparatus so that part accuracy and integrity is maintained.
5. Solidification resulting from the combination of the output of the synergistic stimulation source and the building material (at least the main component of it) generates a layer of structure and the formation of a plurality of such layers, each with its own appropriate cross-section, results in the generation of a three-dimensional object. For example, this might be polymerization induced by ultra-violet radiation, resulting in the generation of solid plastic, forming the structure of a thin solid slice of the stereolithography part.
6. Coating of a new layer of material (e.g. photopolymer) of the correct, uniform thickness to enable a next layer to be generated in the manner of steps 4 and 5 above.
7. Continuation of steps 4, 5 and 6 until the part is complete and ready for post-processing.

The time required to build a three dimensional object is based on the time to perform steps 4, 5, and 6 for each layer, and on the number of layers. Step 6 is the primary step of interest in this application and methods and apparatus for reducing the time involved in this step will be disclosed.

For example, for many parts currently being generated by stereolithography using a liquid photopolymer, a significant amount of time (often in excess of 50% of the total part building time) is spent in the recoating process. The reasons for this are basically four-fold.

A. With layer thicknesses as thin as 0.005" and smaller, many parts can require thousands of layers and hence, thousands of recoating operations.

B. If gravity is used as the only driving force for fluid relaxation, it can be shown that in a viscous fluid with a very small Reynolds number, the characteristic velocity, V*, for the fluid flow to reestablish the new layer, is given by $$V^* = \frac{g_o(\delta H)^2}{2\mu}$$

where is the density of the fluid (grams/cm$^3$), $g_o$ is the acceleration of gravity (cm/sec$^2$), $\delta H$ is the height (i.e., thickness) of the fluid layer (cm) and $\mu$ is the fluid viscosity (gram/cm-sec).

C. Because $\delta H$ is a small number (e.g. 0.01 cm) then $(\delta H)^2$ is a very small number. Thus, thin layers result in very low values of V*, which correspond to very long surface relaxation times. These long times reduce system productivity.

D. Finally, the viscosity of presently preferred photopolymers is quite high (e.g. 2000 centipoise or 20 gram/cm-sec). Since V* is inversely proportional to the fluid viscosity, higher viscosity photopolymers further reduce the flow velocity and therefore further increase the relaxation time.

The result, for photopolymers presently being used in stereolithography, and for thin layer thicknesses, is that recoating between layers can become very time consuming.

For example, a ten inch high part, being built with 0.005" layers will require 2000 layers. Additionally, if surface relaxation currently takes approximately 40 seconds to achieve adequate uniformity per layer (viz, liquid height variations nowhere exceeding 0.0005 inch), slightly more than 22 hours will be required simply for carrying out the repeated recoating process. Further, this time when added to the initial set-up time and to the laser drawing time can exceed 40 hours for production of the part of this example.

As for the case of practicing stereolithography with liquid photopolymers, when stereolithography is practiced with powder based fluidlike materials there are significant times and difficulties involved with obtaining uniform coatings over previous layers of structure.

Clearly, reduced part building time will enhance productivity, improve iterative turn-around time and reduce total time to generate a completed, useful part. This, in turn, will make more commercially practical the field of stereolithography for the production of parts.

2. Description of Related Art

Historically, a number of different approaches have been employed for recoating parts for stereolithography.

One approach, when using a liquid based fluidlike building medium (e.g. a liquid photopolymer) is known as "unidirectional recoating" or "down dip recoating." In this approach the part is moved downward relative to the surface of the liquid ("working surface") by one layer thickness. This is accomplished by either dipping the part below the liquid surface or by adding sufficient liquid to the container in order to raise the fluid level relative to the part with a corresponding lowering of the entire vat or adjusting of the synergistic stimulation dispensing system. This approach requires the fluid to flow over the part in order to coat the surface. Since during this process only a small δH (δH=layer thickness) is produced, the fluid has a low characteristic velocity and therefore it takes a long time to coat over the part. This approach also can suffer from surface tension resulting in a significant resistance to recoating. This approach also suffers from the fact that the coating of the part approaches the correct level from the low side (i.e. a coating of too little thickness) as opposed to the high side (i.e. a coating of too great of a thickness). Since the proper fluid level is approached from the low side and if the fluid is not allowed to come up to exactly the proper level this difference may build up in an accumulative manner from layer to layer. This build up of a depression in the part can lead to part inaccuracy and to lack of adhesion between layers which may lead to the inability to complete fabrication of the part. Therefore this approach not only suffers from an inherently long recoating time; it further suffers from the fact that the coating process must continue until an almost perfect coat has been achieved which increases the coating time even further. In other words this approach doesn't have a reasonable tolerance band around which the liquid can be considered to have coated the part to a sufficient extent to continue part building. On relatively small cross sectional parts (a part with a cross-section of 1 inch by 1 inch) of relatively thick layers (½ mm=20 mils), recoating time is typically on the order of tens of minutes to hours depending on the viscosity of the building material.

When using liquid building materials, a second approach greatly improved recoating times as compared to the previous approach. This approach is known as "over coating", "bidirectional coating", or "overdipping." In this approach the part is given an excess coating of material (at least over a substantial portion of it) and then this excess coating is allowed to recede to the proper level thereby resulting in the formation of a coating of fluid over the part equal to the desired layer thickness. This excess coating of material can be applied in several ways; however, the usual approach is to dip the part well below the working surface of the fluid. Alternatively, excess material can be added to the building chamber with a portion of it to be removed later. Another approach would be to add only sufficient material to the building chamber that would increase the liquid level by the appropriate thickness after it becomes uniformly distributed; however, the material is selectively added to the chamber in such a way as to create at least a momentary coating of excess thickness over at least a substantial portion of the previous layer of structure created. These alternative approaches require the lowering of the vat or the like if the working surface of the building material is to remain at a constant level relative to the rest of the apparatus or alternatively the adjusting of the synergistic stimulation system and other components to account for any change in the vertical level of the working surface. In terms of the first embodiment of this approach, the large value of δH significantly increases V* and thereby greatly reduces the time for the fluid to fill in the void created by lowering the part. However, the top of the part is, by definition, now lower than one layer thickness below the desired working surface and has a coating of thickness greater than that desired over all or most of the previously-formed cross-section. The part must now be raised so that it is one layer thickness below the working surface. This raising typically pushes up a bulge of resin above the working surface. The resulting bulge of resin must be allowed to decrease in thickness in order to produce a net coating of the proper thickness. In a viscous fluid, "runoff" from an elevated bulge or mound of fluid is also slow. As a result, the building operation must again wait for gravity to accomplish the desired fluid surface relaxation. This second approach does lead to substantially reduced recoating times as compared to the first approach for several reasons: 1) The mound formed may initially have a δH significantly greater than that of the layer thickness and therefore initial run off will be very rapid, 2) The minimum δH with this second approach is substantially equal to the layer thickness whereas with the previous approach only the maximum δH approached the layer thickness, 3) In this second approach, surface tension is quickly overcome by the large initial δH and therefore generally doesn't act appreciably to hinder the coating process but in actuality helps the bulge reduction process, and 4) This method approaches the proper coating level from the high side which results in a reasonably broad tolerance band around which the coating can be considered acceptable for continuing the building process. This is because minor deviations in fluid level that are on the high side are less likely to result in the build up of an accumulated bulge of material as layers are successively coated. Once the fluid surface is sufficiently smooth, part building may again proceed. On relatively small cross sectional parts (a part with a cross-section of 1 inch by 1 inch) of relatively thick layers (½ mm) recoating time is on the order of minutes. This approach to recoating is described in U.S. Pat. No. 4,575,330, which is incorporated by reference as if set forth in full herein.

A third approach involves the use of a doctor (sweeping) blade intended to improve the recoating operation by reducing the time required to recoat parts. A blade recoating system is described in U.S. patent application Ser. No. 249,399 filed Sep. 26, 1988, now abandoned by T. Almquist, incorporated herein in full by this reference. Additional disclosure is given in PCT Publication Number WO 90/03255, published Apr. 5, 1990, by Almquist, incorporated herein in full by this reference.

Generally, as in the last approach, the partially completed part is over-coated with resin so that a bulge of resin is formed over the previously-formed cross-section of the part when the part is located one layer thickness below the working surface of the resin. However, instead of waiting for gravity to decrease the bulge, the majority of it is swept away by the movement of a blade that sweeps across the vat above or at the desired working surface while the top of the previously created cross-section is a particular distance below the blade (usually one layer thickness). This sweeping procedure brings the coating thickness, over the part, to approximately one layer thickness. Alternatively the part may not be initially significantly overcoated with resin but instead located approximately one layer thickness below the surface of the resin while the blade makes one or more passes over the part with the lower edge of the blade slightly below the working surface in order for the blade to sweep resin over the part and produce a coating of approximately the desired layer thickness. The blade is then moved relative to the desired working surface so that its lower surface is at or slightly above the resin surface and additional sweeps are performed to bring the resin level over the previously formed layer of structure to the appropriate thickness. This is possible since there is a meniscus of resin that connects the blade to the resin even when its lower surface is slightly above the working surface.

As with the previous approaches, surface relaxation of a viscous fluid under a very minuscule gravitational head is a very slow process. A moving blade does speed the fluid relaxation process; however, simple approaches to blade use can create problems for some part geometries, especially parts involving trapped volumes. The cross-section of a trapped volume has hardened structure surrounding an unsolidified area where the fluid in the surrounded area is also trapped from below by previously solidified material. Therefore, the fluid in a trapped volume can not communicate with the other unsolidified material in the vat. Even when more complex approaches are used, which generally require more time, and the blade can be effectively used for all part geometries, the blade produces a working surface that still is not perfect. If this imperfect surface does not fall within the specified tolerance band, then gravity leveling is used to bring the surface to the correct level. Therefore, as with previous embodiments this embodiment suffers from the fact that the leveling process may eventually be reduced to that of gravity leveling with small values of δH and therefore unacceptable recoating times.

In summary, gravity generally does not provide an adequate driving force for forming thin uniform coatings over a previously formed layer of structure in preparation for formation of a second layer of structure.

An approach to coating previously formed layers of structure when a powder is used as the fluidlike building material, is described in U.S. Pat. No. 4,863,538 granted Sep. 15, 1989, and in associated PCT Patent Application Number US87/02635 filed Oct. 14, 1987 by Carl R. Deckard. This referenced application describes the dispensing of an amount of powder (volume) in preparation for formation of a next cross-sectional layer of structure. This volume of powder (cross-sectional area of the building chamber "A" multiplied by the desired layer thickness "T" yields the volume "V") is such that a coating of the desired layer thickness is formed over the previously dispensed material. As described, this volume is the same amount for each layer. Material is dispensed by a hopper just in front of a counter-rotating roller which is located near one end of the building chamber and whose lower level is located vertically at the desired working level. After the material is dispensed, the counter-rotating roller moves across the length of the building chamber sweeping a decreasing mound of material before it as it leaves a layer of fresh building material behind. Improvements to this approach are greatly needed to insure accurate and more rapid layer-by-layer formation of an object.

For further details of stereolithography, reference is made to U.S. Pat. No. 4,575,330 and the following pending U.S. patent applications which are incorporated herein by this reference in their entirety, including appendices attached thereto or material incorporated therein by reference, as if fully set forth herein:

U.S. Pat. No. 5,104,592 issued Apr. 14, 1992, entitled "STEREOLITHOGRAPHIC CURL REDUCTION";

U.S. Pat. No. 5,184,307, issued Feb. 2, 1993, entitled "METHOD AND APPARATUS FOR PRODUCTION OF HIGH RESOLUTION THREE-DIMENSIONAL OBJECTS BY STEREOLITHOGRAPHY";

U.S. Pat. No. 5,015,424 issued May 14, 1991, entitled "METHOD AND APPARATUS FOR PRODUCTION OF THREE-DIMENSIONAL OBJECTIONS BY STEREOLITHOGRAPHY";

U.S. Pat. No. 5,015,424 issued Dec. 31, 1991, entitled "METHOD FOR CURING PARTIALLY POLYMERIZED PARTS";

U.S. patent application Ser. No. 268,428, filed Nov. 8, 1988, now abandoned, entitled "METHOD FOR FINISHING PARTIALLY POLYMERIZED PARTS";

U.S. patent application Ser. No. 268,408, filed Nov. 8, 1988, now abandoned, entitled "METHOD FOR DRAINING PARTIALLY POLYMERIZED PARTS";

U.S. Pat. No. 5,058,988 issued Oct. 22, 1991, entitled "APPARATUS AND METHOD FOR PROFILING A BEAM";

U.S. Pat. No. 5,059,021 issued Oct. 22, 1991, entitled "APPARATUS AND METHOD FOR CORRECTING FOR DRIFT IN PRODUCTION OF OBJECTS BY STEREOLITHOGRAPHY";

U.S. Pat. No. 5,123,734 issued Jun. 23, 1992, entitled "APPARATUS AND METHOD FOR CALIBRATING AND NORMALIZING A STEREOLITHOGRAPHIC APPARATUS";

U.S. patent application Ser. No. 249,399, filed Sep. 26, 1988, now abandoned entitled "METHOD AND APPARATUS FOR PRODUCTION OF THREE-DIMENSIONAL OBJECTS BY STEREOLITHOGRAPHY";

U.S. Pat. No. 5,143,663 issued Sep. 1, 1992, entitled "INTEGRATED STEREOLITHOGRAPHY";

U.S. patent application Ser. No. 265,039, filed Oct. 31, 1988, entitled "APPARATUS AND METHOD FOR MEASURING AND CONTROLLING THE LEVEL OF A FLUID";

U.S. patent application Ser. No. 269,801 filed Mar. 31, 1989, now abandoned entitled "METHOD AND APPARATUS FOR PRODUCTION OF HIGH RESOLUTION THREE DIMENSIONAL OBJECTS BY STEREOLITHOGRAPHY";

U.S. Pat. No. 5,182,056 issued Jan. 26, 1993, entitled "IMPROVED SYSTEM FOR PRODUCTION OF THREE-DIMENSIONAL OBJECTS BY STEREOLITHOGRAPHY EMPLOYING VARIOUS PENETRATION DEPTHS AND BEAM PROFILE";

U.S. patent application Ser. No. 558,922, now abandoned, entitled "IMPROVED SYSTEM FOR POST-PROCESSING";

U.S. patent application Ser. No. 415,134, filed Sep. 26, 1989, now abandoned, entitled "IMPROVED STEREOLITHOGRAPHIC POST CURING";

U.S. patent application Ser. No. 414,200, filed Sep. 28, 1989, now abandoned, entitled "AN APPARATUS AND RELATED METHOD FOR FORMING A SUBSTANTIALLY FLAT STEREOLITHOGRAPHIC WORKING SURFACE";

U.S. patent Ser. No. 415,168, filed Sep. 29, 1989, now abandoned, entitled "METHODS OF COATING STEREOLITHOGRAPHIC PARTS";

U.S. Pat. No. 5,133,987 issued Jul. 28, 1992, entitled "STEREOLITHOGRAPHY APPARATUS";

U.S. patent application Ser. No. 428,492, filed Oct. 27, 1989, now abandoned entitled "RAPID AND ACCURATE PRODUCTION OF STEREOLITHOGRAPHIC PARTS";

U.S. Pat. No. 5,130,064 issued Jul. 14, 1992, entitled "IMPROVED STEREOLITHOGRAPHIC CONSTRUCTION TECHNIQUES"; and PCT Publication No. WO 90/03255 published Apr. 5,1990, entitled "RECOATING OF STEREOLITHOGRAPHIC LAYERS."

SUMMARY OF THE INVENTION

One aspect of the present invention comprises a method and apparatus for utilizing vibrational energy to speed the stereolithographic recoating process.

Accordingly, it is an object of this invention to provide an apparatus for rapidly, accurately, uniformly, and reliably generating planar working surfaces of building material in preparation for formation of a successive layer of structure in the formation of objects by stereolithographic techniques.

A second aspect of this invention is to provide an improved method for rapidly, accurately, uniformly, and reliably generating coatings of building material of appropriate thickness that will be used to form layers of structure of a desired thickness so that an accurate three-dimensional object can be created by the techniques of stereolithography.

In a preferred embodiment, vibrational energy is used to increase the rate of distribution of building material, to more rapidly level the surface and uniformly distribute the material, wherein the vibrational energy is imparted to the medium by a vibration element which is in direct contact with the medium. In another embodiment, the vibrational energy is imparted to the partially completed object which is being created stereolithographically. This in turn imparts the energy into the unsolidified medium. In an additional embodiment, the vibrational energy is imparted into the building chamber and it in turn transmits the energy to the medium.

Other and further objects, embodiments, and advantages of the present invention will be apparent upon consideration of the present disclosure.

BRIEF DESCRIPTION OF THE DRAWINGS

FIG. 7 is a schematic diagram showing an apparatus used to implement a second preferred embodiment of a vibrational actuator for the present invention that vibrates the object which in turn transmits vibrational energy to the building material.

DESCRIPTION OF THE PREFERRED EMBODIMENTS

Figure 1:
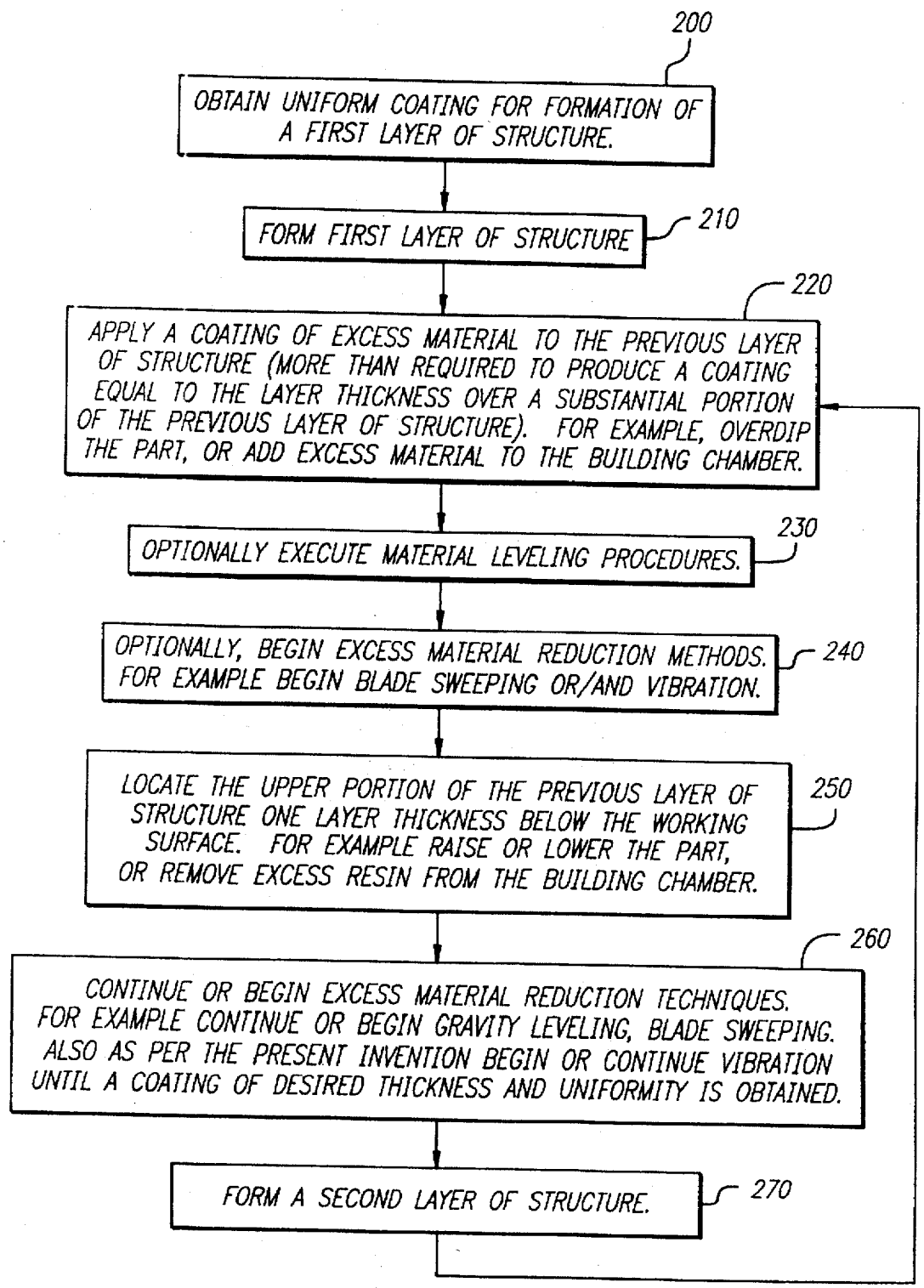
FIG. 1 is a flow chart depicting the various steps involved in implementing a first preferred embodiment of this invention.
Figure 2:
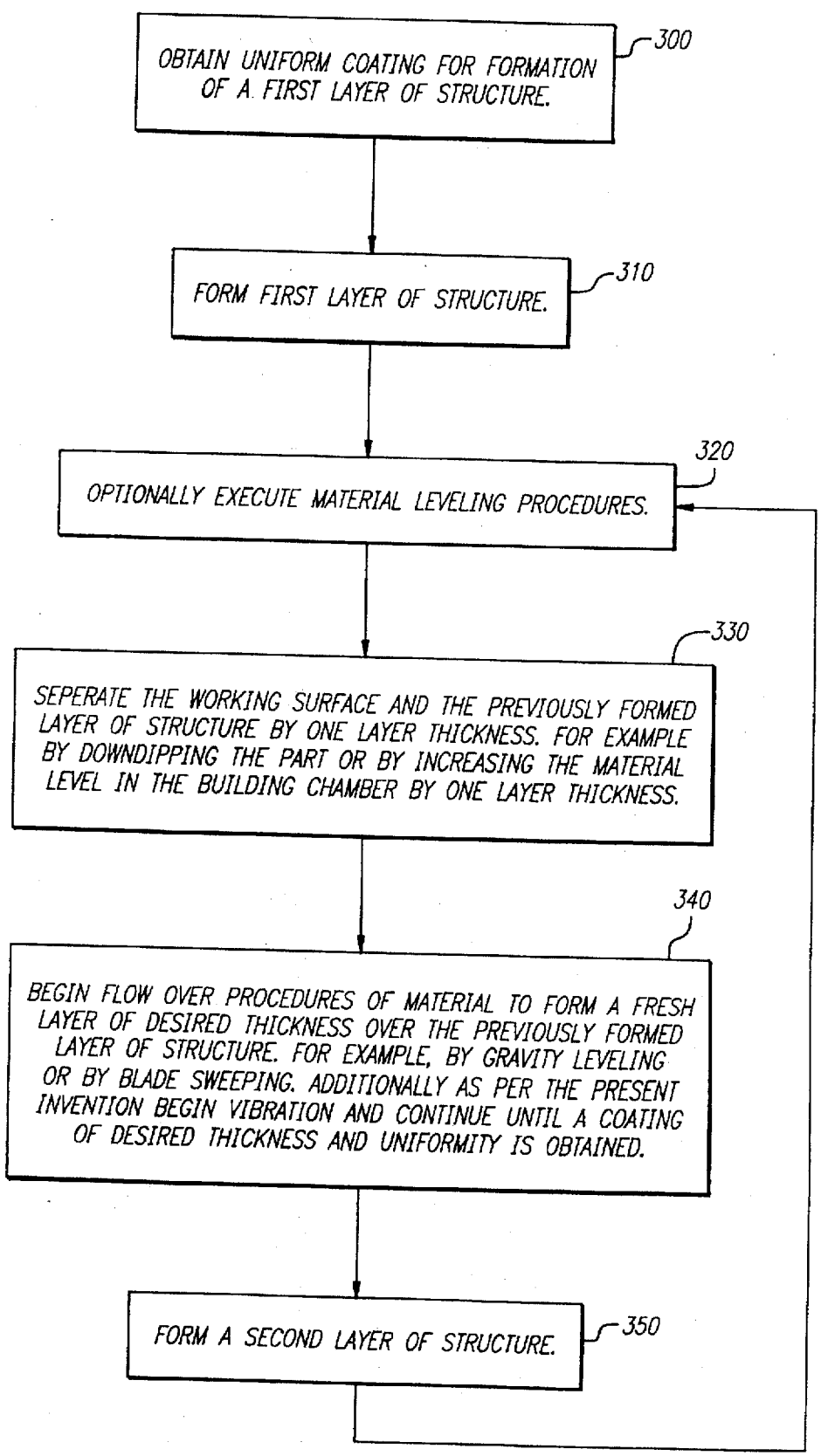
FIG. 2 is a flow chart depicting the various steps involved in implementing a second preferred embodiment of this invention.

FIGS. 1 and 2 are basic flow charts illustrating two preferred methods of practicing the present invention. In the practice of this invention a three-dimensional object is created from a computer-stored representation of the object, or the like, by selectively solidifying a fluidlike medium on a layer by layer basis. Each layer is solidified in response to synergistic stimulation applied to the surface of the solidifiable medium in a manner appropriate to create a thin cross-section of the three-dimensional object. Each successive layer of structure is formed by solidification of a layer of fresh material that is coated over the previously formed cross-section (layer of structure). As each successive layer of structure is solidified, it adheres to or is adhered to the previous layer of structure.

The layer thicknesses appropriate to this building process depend on a variety of factors. First, one must consider the thickness of coatings of the medium that can be formed in a reasonable time period. Generally, the thicker the coating the easier and quicker the recoating process. Second, one must consider the resolution (layer thickness) necessary to reproduce the object in an acceptable manner. Generally, the thinner each layer the more precise the reproduction. Third, one must consider the ability of the medium and the synergistic stimulation to work together to form layers of structure rapidly and with sufficient cohesiveness to maintain their structural integrity during the part building process. Generally, the thinner the layers the less cohesive the formed layer of structure and the more easily it can be distorted during various phases of the building process.

The preferred stereolithography medium is a photopolymer that has been specially designed to balance the characteristics discussed above. The presently preferred photopolymer is XB-5081 manufactured by Ciba-Geigy, Ltd. of Basel, Switzerland. This material is generally used to build layers of 5 to 20 mil thickness. It is generally used in combination with a HeCd laser emitting 325 nm radiation. A second preferred material is LMB-4913 also manufactured by Ciba-Geigy. This material is used in combination with an Argon-Ion laser operating simultaneously at multiple wavelengths (approximately 363 nm, 351 nm, and 334 nm). Additional stereolithography resins also exist. These resins have a variety of properties. For working with smaller layers than those mentioned above, it may be advantageous to increase the absorptive properties of the resin at the synergistic wavelengths and possibly to modify other resin characteristics to insure formation of adequately cohesive thin layers of structure. Additionally, it may also be advantageous to adjust the cohesive and adhesive properties of the fluid material to insure the ability of forming thin, uniform coatings of fluid.

Other forms of synergistic stimulation include visible, IR, or other electromagnetic radiation, particle beams, dispensing of chemicals by ink jet, or the like.

Alternatively, any of a variety of powders may be selected as the fluidlike building medium from which a solid three-dimensional object will be extracted. When using powders, coating over previously cured layers of structure with fresh powder in preparation for formation of a next layer of structure involves the dispensing of additional powder into the building chamber, followed by the uniform distribution of the powder, and then possibly by compression of the powder to achieve a desired density. The dispensing of powder may be based on the use of the appropriate quantity necessary to achieve the proper layer thickness. Alternatively, it may be based on the dispensing of a quantity of material in excess of that needed for formation of the next coating with the excess material being removed from the building chamber prior to the selective transformation of the building medium by exposure of the cross-section to appropriate synergistic stimulation. Additionally, depending on the density of the powder achieved prior to exposure, it may be necessary perform additional processing steps to insure formation of a layer of structure of desired thickness and/or to ensure that after exposure the surfaces of the transformed material and the untransformed material are at the same level. These results can be accomplished in several ways: First, a coating of powder may be deposited and distributed that is thicker than the desired layer of structure to be transformed. Due to shrinkage, after transformation the layer of structure transformed would be of the desired thickness. One could then proceed on to the next layer of structure to be formed by depositing and distributing an excess amount of material, which would fill in the depressions caused by the transformation of the material on the previous layer. A sweeping blade, as described earlier, for use with liquid photopolymers, or a rotating roller, or the like, can be used to sweep across the part building chamber at or near the desired working surface to remove excess powder, to yield a coating of the appropriate thickness that will produce transformed material of the appropriate thickness. This is the preferred approach since slight variations in thickness of the layers of structure formed will be compensated for by each successive layer formed. A second approach involves the depositing and distribution (and compression) of material that is as thick as the desired thickness of the layer of structure to be formed. This is followed by transformation of the material. This in turn is followed by the depositing of additional material, then its distribution into the depressions formed by the first transformation and followed by the removal (e.g. sweeping away) of material above the level of the untransformed material initially laid down. This fresh, filling, material is then transformed by a repetition of the same cross-sectional information used previously. These steps may be repeated several times until a layer of structure is formed that is within the desired tolerance of the desired thickness and whose surface is substantially that of the untransformed material. After formation of the appropriate layer of structure, the process proceeds onto coating and formation of a next layer of structure. This approach has the advantage of possibly requiring the sweeping away of less material before each exposure. This is especially true when a large change in density occurs by transformation. A third approach involves the depositing of sufficient material to form a layer of structure at least as thick as desired, exposing the material, followed by trimming away excess untransformed material and possibly transformed material. This produces a new section at the desired working surface that has both transformed and untransformed material at the same level and results in a layer of structure of desired thickness. It is possible in all of these embodiments that the working surface may change from layer to layer relative to the apparatus (as long as all appropriate factors are accounted for) or it may stay fixed relative to the apparatus by lowering the partially completed object and untransformed material by one layer thickness after formation of each layer. As with photopolymers, the synergistic stimulation may be applied in a variety of appropriate ways. It is possible to use a radiation source that can sinter the particles together, or allow the particles to melt followed by allowing the mass to resolidify by cooling or to bind the powder particles by use of a polymerizing radiation with or without a melting step, or to inject a chemical initiator or binder into the powder in the desired pattern by use of an ink jet dispenser, or the like.

FIG. 1 is a flow chart depicting a preferred embodiment of the present invention. Step 200 of FIG. 1 refers to the obtainment of a uniform and appropriate thickness coating over a first layer of structure of the object being created. For purposes of illustration, the obtainment of this coating is assumed.

Step 210 refers to the solidification of a layer of material of appropriate cross-sectional shape and depth. As described previously, this solidification process occurs by selective application of synergistic stimulation to the building medium. Appropriate forms of synergistic stimulation include UV, visible, IR, or other electromagnetic radiation, particle beams, dispensing of chemicals by ink jet, or the like. Also as described previously, the building materials may be a variety of fluidlike materials that are solidifiable in a controlled manner when combined with one or more of the stimulants. These, for example would include UV sensitive photopolymers, IR responsive sinterable powders, bindable powders and dispensing of binder, or the like.

Step 220 calls for the coating over of the previously formed layer of structure with building material in excess to the thickness of the desired coating of fresh material. This step may be based on one of the various techniques described earlier, or the like, or combinations of them. There are several purposes to coating over the previous layer of structure with excess material: 1) To speed the inflow of fresh material over the previous cross section (primarily for liquid building materials), and 2) To ensure that sufficient material is added to the building chamber to fill in the surface discontinuities between the solidified and unsolidified portions of the previous layer, and possibly 3) If one is using a material with considerable shrinkage, it may be desirable to dispense a coating of material such that a coating is formed of greater thickness than the desired thickness of the layer of structure to be formed so that after transformation the layer of structure formed has the appropriate thickness. Regardless of the medium, the upper surface level of the layer of structure formed in step 210 is assumed to be known within acceptable tolerance limits. The medium surface level desired as the next working level can be precisely set by movement of mechanical elements, for example such as the dipping of the partially completed object a certain distance into a liquid medium, or the lowering the building chamber a specified distance relative to a fixed sweeping device. This leaves just the need of decreasing the excess coating thickness to the desired thickness.

Step 230 calls for implementation of optional material leveling techniques. In this step the primary concern is the determination that the surface level of a liquid building material will be at the proper working surface when it becomes time to apply the synergistic stimulation. The setting of the material surface to that of the working surface while using a powder medium can be accomplished just prior to application of the synergistic stimulation. The matching of material surface to working surface for a liquid medium is complicated by the fact that gravity generally has a greater effect on determining the surface level of a liquid than a powder. Since the powder is capable of flowing, it is an acceptable material for the present invention. However, gravity has substantially the same effect on minor surface imperfections whether or not the coating of powder is over a previously solidified layer of structure or over a relatively deep area of unsolidified powder. Because this is not generally true for liquids, the accurate determination of liquid level is most effectively done when the previous layer of structure is substantially below liquid level. For the previously mentioned photopolymers this generally corresponds to several millimeters.

If overdipping techniques, as opposed to addition of more material into the chamber, are used to obtain a coating of sufficient thickness to do the necessary level checking the surface of the resin substantially corresponds to the working surface and in general any deviations are minor and can be compensated for by several methods. One possible approach to making such compensations, is to immerse or retract a plunger into or out of the building chamber to displace sufficient material to raise or lower the surface level enough to make it match the working surface. Alternatively the surface level may be adjusted by raising or lowering the whole building chamber.

If excess material is added to the building chamber in order to obtain an excess coating it is possible to extract a known quantity of material from the chamber after the excess coating level has been made to match a particular level. This matching of a particular level may be accomplished by the means associated with the previous approach or alternatively it may be accomplished by pumping means, of the like.

Step 240 calls for the optional initiation of methods directed towards reducing the excess coating. The material and the various methods involved in obtaining the excess material may require different methods of reducing the coating to the desired thickness. It may be required to bring the surface of the material to the desired working surface level or/and it may be required to relocate the partially completed object so that the upper surface of its previously created layer of structure is one layer thickness below the desired working surface. This step involves the partial reduction of the excess coating prior to the final location of the part one layer thickness beneath the desired working surface. Additional coating reduction, after the proper relative positioning of the part and the working surface is obtained, is called for in step 260 and will be discussed later. During this step the relative positioning of the part and working surface may be varied to speed the reduction of the excess coating. For example, as described in the previously referenced PCT publication number WO 90/03255, the part and working surface positions are varied in the process of "staged sweeping". As per the subject invention, the use of vibrational stimulation at the surface of the building material can be used to effectively decrease the time required to reduce the coating of excess thickness. Several embodiments of inducing this vibrational stimulation will be discussed later. The variables involved in the application of the vibrational stimulation include the frequency, the amplitude, the time duration, the coupling means, the use of multiple frequencies simultaneously or in sequence, the location of the upper surface of the partially completed part and the desired working surface, and possibly the waveform of the vibration. For example, the surface level of the building material may be vibrated as the part is moved toward the position of desired layer thickness. The vibration thereby enhances the ability of the material to flow from the part. Alternatively during this step and with the use of a powder medium, vibration can be effectively used to uniformly distribute the powder and possibly increase its packing density prior to attempting to reduce the coating thickness. In this case and depending on the amount of excess material it may be necessary to use multiple frequencies sequentially or simultaneously in order to reduce any nodes or antinodes (standing waves) that might develop on the surface. Also for example, vibration might be used simultaneously with, or in between, the sweeps of a blade in order to enhance coating uniformity and to enhance the reduction of the excess coating. Additionally, vibration might be induced to the fluid medium through the doctor blade itself.

Step 250 calls for locating the upper surface of the last completed layer of the partially completed object one layer thickness below the desired working surface. The result of this step will likely still be a coating of excess thickness, maybe in the form of a bulge of excess thickness of material over the part. This step may be implemented by either moving the part within the vat of material to obtain the proper relative positioning or/and by moving the building chamber, including the part and the untransformed material, relative to a fixed desired working surface in order to locate the upper surface of the previous layer of structure one layer thickness below the desired surface.

Step 260 calls for initiation or continuation of coating thickness reduction techniques. These techniques include the same ones mentioned in association with step 240. The primary difference between this step and step 240 is that the final result of this step will be a uniform coating at the proper vertical position and of proper thickness over the partially completed part. If the use of a doctor blade, or the like, is combined with the use of vibration, it maybe found to be difficult to obtain coatings of appropriate thickness. (For example, it is often difficult to obtain a balance between scoop out of too much material, above trapped volumes and the inability to remove sufficient material, above large flat areas). It may be desirous to set up sweeping conditions for the doctor blade so that on every other layer slight "scoop out" is obtained followed by vibrationally enhanced leveling. On alternate layers sweeping conditions are used such that a slight bulge remains followed by vibrationally enhanced leveling. In this way formation of depressions (scoop out) or build up of mounds is prevented from accumulating from layer to layer.

Step 270 calls for the formation of a next layer of structure from the coating of material obtained in step 260. This step completes the processing for a given layer. From here the process loops back to stop 220 in preparation for formation of a next layer of structure.

FIG. 2 is another flow chart representing a second preferred embodiment of the present invention. Steps 300 and 310 are identical to steps 200 and 210 of FIG. 1. These steps involve the formation of a previous layer of structure.

Step 320 can be performed at the location presented in the flow chart or alternatively it can be preformed between steps 340 and 350. This step calls for the optional detection and adjustment of the actual surface level to bring it into conformity with the desired working surface. As described earlier in association with step 230 of FIG. 1, if a powder medium is being used, the conformity of these two may be automatically obtained from the process of obtaining a uniform coating. However, for a liquid medium this step is generally not automatically accounted for by other processes. In fact it has been found to be very difficult and/or time consuming to accurately perform this process without a coating of excess material. Since there is generally some time associated with the settling of a viscous liquid material to form a thin coating it is generally faster to perform this step at its depicted location than to attempt it between steps 340 and 350. However it should be noted that performing it at either time may give erroneous results if the liquid level is not substantially uniform. Eventually the most effective method of performing this step might be by a non-contact method of determining surface uniformity simultaneously over the entire working area associated with the combined or separate ability to detect the vertical position of the surface and a method for compensating for any differences.

Step 330 calls for the separation of the working surface and the previously formed layer of structure by one layer thickness. This step may be performed by lowering the part one layer thickness into a vat of liquid medium or by the raising of the level of the liquid material in the vat by one layer thickness and adjusting the appropriate components to account for the change in working surface level. Alternatively, for either powder or liquid medium, the floor of the building chamber can be lowered by one layer thickness and sufficient material added to the building chamber to raise the level back to the working surface.

Step 340 calls for the addition of one layer thickness of building medium to the building chamber or alternatively the flowing of fresh building material over the previous layer of structure of the amount necessary to produce the proper coating thickness. Alternatively, as a combinational approach, this addition can be accomplished by dispensing an appropriate volume of fluid-like material over the previous layer of structure (e.g. powder or liquid). Thereby, this results in excess material height over at least a portion of the previous layer of structure. After dispensing the coating material, it can be vibrated to reduce imperfections. Approaches to dispensive recoating are disclosed in Fujitsu's Japanese Patent Application 60-59083 Laid Open as SHO. 61-217,219 on Sep. 26, 1986, and also in PCT Patent Application US87/02635 filed Oct. 14, 1987 and corresponding U.S. Pat. No. 4,863,538 by Carl R. Deckard.

If high accuracy parts are to be built it is necessary to account for the shrinkage that may occur when the building material is converted from an unsolidified state to contiguous solid. If a liquid medium is being used this accounting can be done when step 320 is executed. Under some circumstances it may be necessary to adjust the liquid level one layer after the measurement is made. As per the present invention, vibrational energy is used to increase the flow rate of material over the previous layer of structure so as to improve the uniformity of the coating formed while simultaneously decreasing the required recoating time. As with the previous embodiment a doctor blade, or the like, may be used in addition to or in combination with vibration to speed the rate at which the surface becomes uniform.

Other embodiments of this invention will be obvious to one skilled in the art based on the examples of the previous two embodiments and the additional disclosure presented previously and that to be presented in the following pages and the exemplary drawings.

Figure 3A:
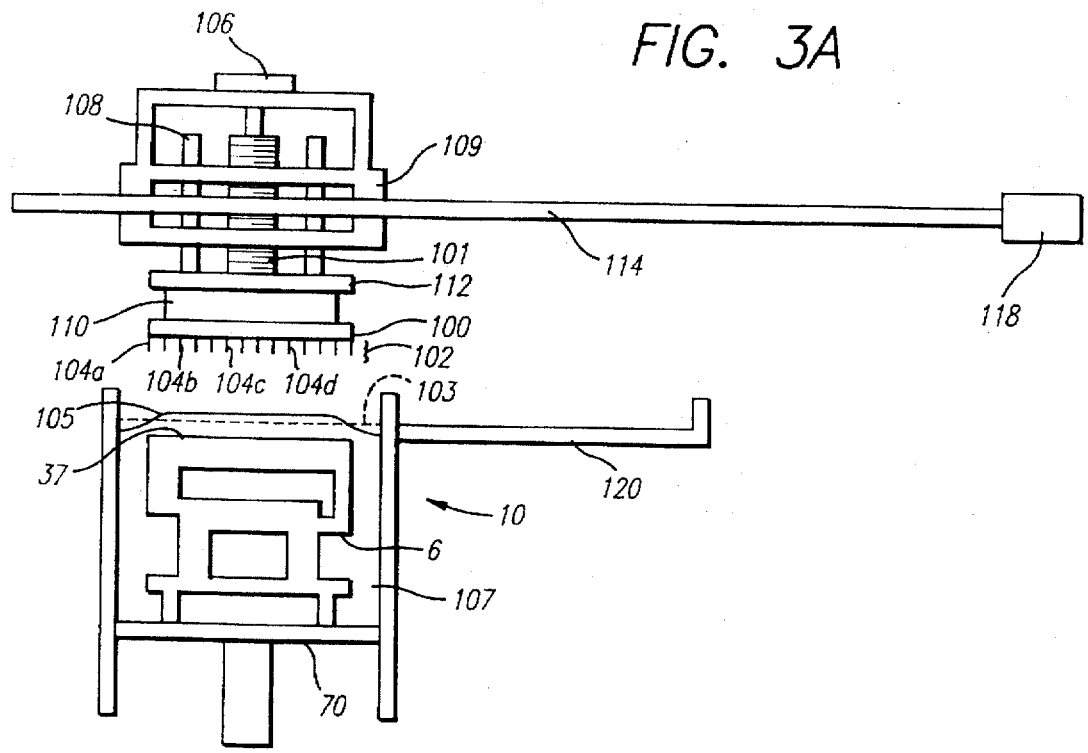
FIG. 3a and 3b are, respectively, a side view schematic diagram and a top view schematic diagram showing an apparatus used to implement a first preferred embodiment of a vibrational actuator for the present invention that vibrates the building material directly.
Figure 3B:
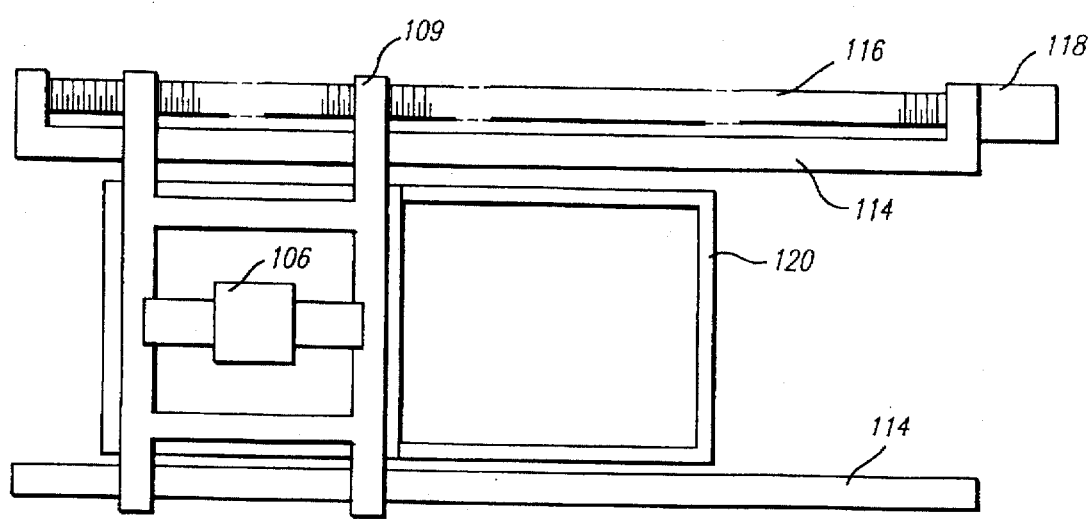

FIG. 3 depicts a first preferred embodiment of a vibrational actuator that can be used with either of the above described vibrationally enhanced coating techniques. The vibrational actuator of this embodiment consists of a vibrating plate 100 with an array of needles or short line probes 104a, b, c, d, and the like, extending a precise distance 102 below the plate. The plate can be translated in the vertical dimension, thereby allowing the probes to be controllably and variably brought into contact with the surface of the building medium for vibrationally assisted recoating. Vertical movement also allows for extraction of the probes from the building medium when other recoating aids are to be used (e.g. a sweeping blade), and to simplify the ability to relocate the vibrating apparatus for application of synergistic stimulation. It is also translatable in at least one horizontal dimension; thereby allowing the needles and vibrating apparatus to be moved out of the path of the synergistic stimulation when exposure is to occur. Alternatively, this apparatus can be rotated either horizontally or vertically to clear the path (not shown).

The needles or narrow line probes 104a, 104b, 104c, 104d, and the like, extend a known distance below a vibratable plate 100. Vibrating plate 100 is in turn attached to computer controlled vibration element 110 and in turn the vibration element is attached to rigid support plate 112. Vibration element 110 is a driver that produces one or more of a variety of vibration modes (e.g. vertical, horizontal, or orbital modes) and is designed such that the vibrations are primarily transmitted into the needles 100 and not into the rigidly supported plate 112. The element 110 may be controlled to produce variable-amplitude, frequence duration, sequence modes and wave forms (i.e., square, saw tool, impulse) and of vibrations. The design of such an element is within the abilities of one of skill in the art. Rigid plate 112 is attached to a ball screw 101, or the like, which can be used to translate rigid plate 112 in the vertical direction. Also attached to rigid plate 112 and extending through mounting plates 109 are guide bars 108. These bars 108 maintain alignment of plate 112 as it is translated vertically. This vertical translation is controlled by computer controlled motor 106 which attaches to the upper end of ball screw 101. This motor may be controlled to variably raise and lower the probes into the building medium during vibration to optimize the coating process as well as to allow removal of the vibrating apparatus from the synergistic stimulation path. The vibrating apparatus is attached to rails 114 by mounting elements 109. The entire vibration apparatus is horizontally translatable through movement of mounting elements 109 along rails 114 by ball screw 116 and computer controlled motor 118. Small movements along rails 114 may be implemented by computer control of motor 118 during vibration to enhance the recoating process and to avoid any vibrational nodes that might otherwise occur. Drip tray 120 allows the vibration apparatus to be translated along rails 114 out of the path of synergistic stimulation without unwanted dispersion of building material. Part 6 in vat 10 is shown with its upper surface 37 located one layer thickness below desired working surface 103 of material 107. Actual material surface 105 is shown bulging above desired working surface 103. Probes 104a, b, c, d and the like can be brought down to contact material surface 105 but not far enough to contact part upper surface 37, and then they can be driven to vibrate and thereby induce energy into the bulging surface of medium 107 causing it to rapidly decrease in height to the equilibrium level which corresponds to working surface 103.

FIG. 4 depicts several side views of various approaches to using the vibrating actuator of FIG. 3. FIG. 4a depicts a partially complete object 6 whose upper surface 37 is located one layer thickness below the desired working surface 103. Vibrating Probes 104 extending below plate 100 are shown with their lower surfaces in contact with or slightly above the desired working surface. The actual surface 105 of building medium 107 is shown as being above the working surface in the region over the previous layer of structure and below the surface in the regions away from the previous layer of structure. The bulge of material over the part is probably such that after the medium has been leveled (brought to equilibrium) the actual material surface will correspond to the desire working surface. Alternatively, the material over the part may be in excess to the material needed; thereby, after leveling a particular quantity of material can be removed to bring the actual surface into correspondence with the desired working surface, possibly followed by additional leveling. The flow of material from the bulge may take an excessive amount of time if acted upon only by gravity and surface tension. This flow rate is enhanced by contact between the bulging regions and the vibrating probes 104. The lower position of these vibrating elements are such that only material that is of excess height will be substantially effected by the vibration. This positioning of the needles also minimizes the perturbations of the surface of the medium due to the exact shape and size of the needles. Needle probes have less surface area than line probe and therefore after their extraction will have less material clinging to them and will therefore leave behind less of a perturbation in the uniformly leveled surface.

Figure 4A:
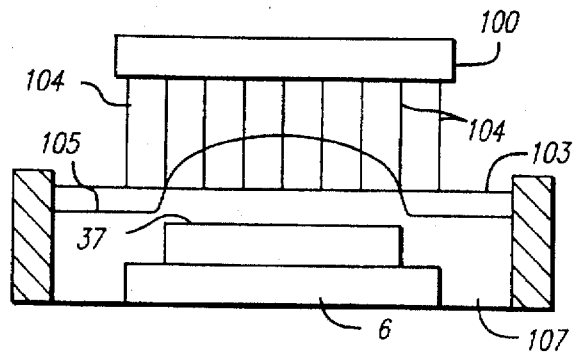
FIG. 4a, 4b, 4c, and 4d are side view schematic diagrams showing the contact of the vibrating elements with the surface of the building material in several utilizations of the actuator of FIG. 3.
Figure 4B:
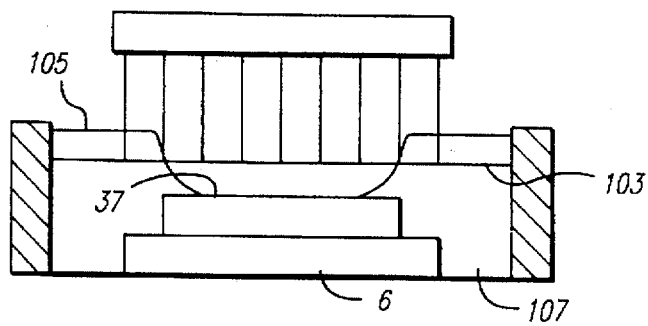

FIG. 4b is similar to FIG. 4a except instead of initially having a part with excess coating over its last formed layer, the excess material is at the sides of the part when it is located one layer thickness below the desired working surface. This excess material is made to flow in over the previous layer of structure in order to form a uniform coating of desired thickness. The quantity of excess material on the sides of the part is probably such that the actual surface and desired working surfaces correspond after leveling. Again, the lower extremity of the vibrating elements is located right at or slightly above the desired working surface so that only regions of excess height will be in contact with the vibrating elements and will therefore be the only regions which have their relaxation rate enhanced by vibration.

Figure 4C:
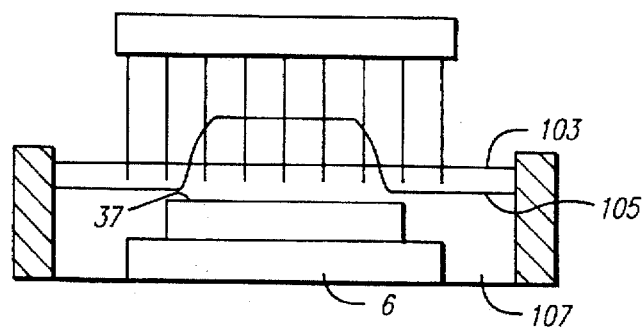
Figure 4D:
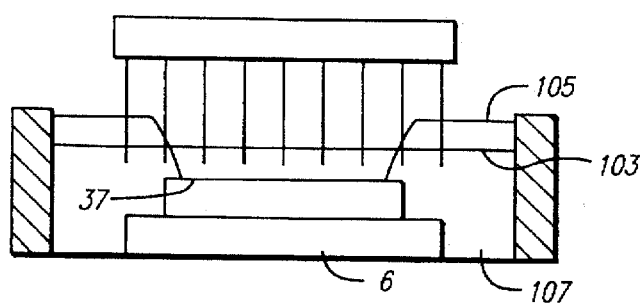

FIG. 4c and 4d represent similar situations to those depicted by FIGS. 4a and 4b respectively, except that the lower extremity of the vibrating elements is located between the desired working surface and the previous layer of structure formed. This configuration allows better coupling between the vibrating elements and the building material. These figures represent the more preferred technique of coupling. If vertical oscillations are to be used, the amplitude of vibration and equilibrium position of the elements must be carefully matched so that if a liquid material is used, excess bubbles are not formed, and so that the vibration elements do not contact the previously formed layer of the part during vibration. In this approach, it is also preferred that the elements be relatively small in cross section, and that the elements are extracted from the material as they continue to vibrate, while simultaneously cutting back the amplitude so that after they are raised above the desired working surface they leave behind a surface that is in appropriate condition for beginning exposure of the next cross-section.

Figure 5:
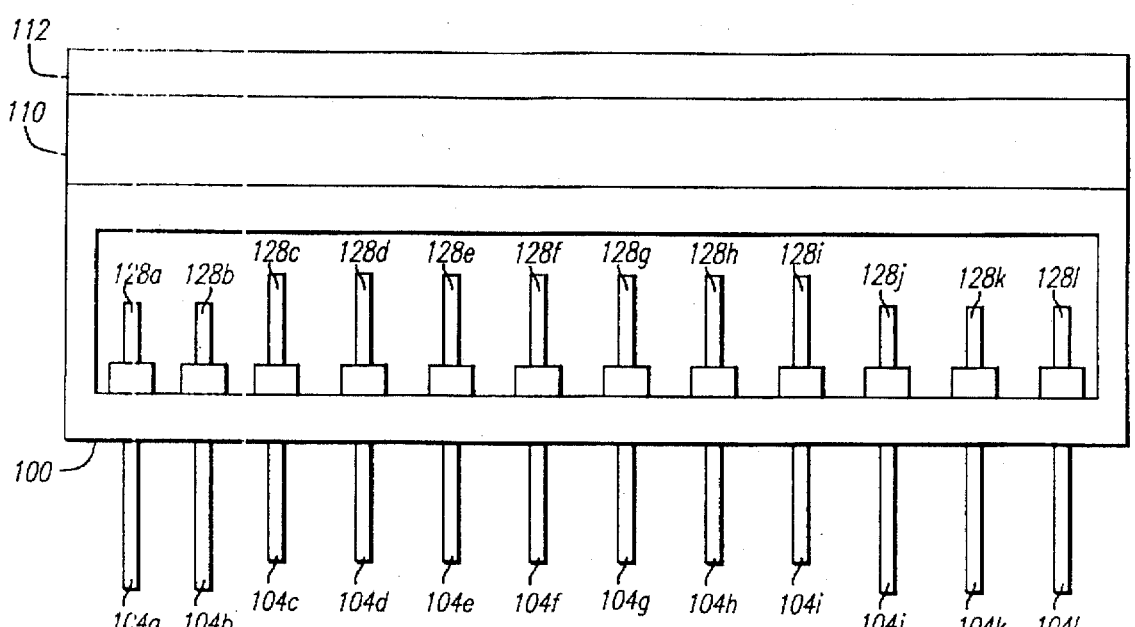
FIG. 5 is a schematic diagram showing a modified actuator of the type depicted in FIG. 3 in which selected vibrational elements can be brought deeper into building material without the threat of striking the object that is being created.

FIG. 5 depicts an alternative vibration actuator to that depicted in FIG. 3. The effectiveness of vibration in increasing the relaxation rate and in decreasing recoating time is directly associated with the coupling obtainable between the vibration elements and the building material in the regions above and around the partially formed object. An apparatus for increasing this coupling while ensuring the avoidance of elements striking the object is depicted in FIG. 5. Each probe of the array of elements is individually retractable in the vertical dimension by at least one or two layer thicknesses. The position of each probe is controlled by a computer based on the location of solidified material formed on the previous one or more layers of the object. For example, the horizontal position of each element is precisely known, and the areas solidified on the previous cross-section are known, and from this it can be determined which elements can be extended deeper into the building material and which elements can not extend more than one partial layer thickness below the working surface. Each element can then be controlled to move up or down by signals from the computer. The activator which induces vertical movement on each element may be a solenoid, or the like, device that drives the element between a lower and upper stop. If the array of elements are equally spaced over a 10 inch by 10 inch area at a spacing of ½ inch apart, this array would require 400 control signals. These signals would not need to be continuously applied but would simply need to toggle the solenoids between on and off. Therefore, multiplexing the signals to the right element would keep the control operation from becoming unmanageable. Alternatively, the vibration may not need to be applied to the whole layer simultaneously thereby reducing the number of elements needed. FIG. 5 depicts plate 100 connecting to vertical movement inducers 128a–l which in turn connect respectively to vibration elements 104a–l. Plate 100 in this embodiment has an upper mounting portion that connects to vibration actuator 110 which in turn mounts to rigid plate 112. Elements 104c–104i are shown retracted upward relative to the other elements. This type of configuration allows better coupling of elements around an object whose previous cross section included the area covered by 104c to 104i, and did not include areas covered by 104a, b, j, k, and l.

Figure 6A:
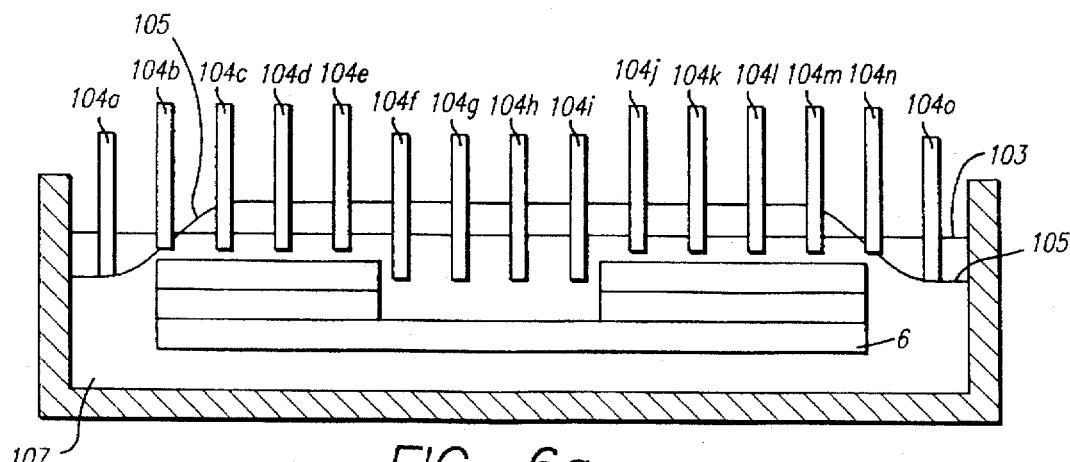
FIG. 6a and 6b are schematic diagrams depicting the contact between the selected vibrating elements of FIG. 5 with the building material.
Figure 6B:
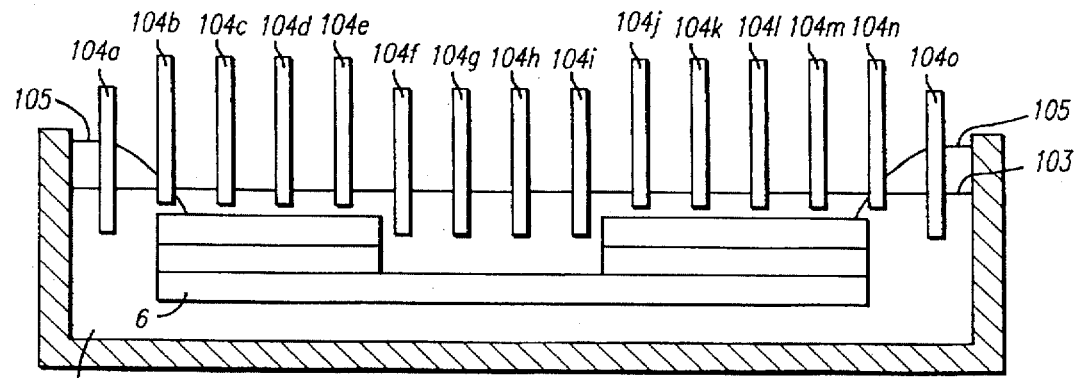

FIG. 6a and 6b depict contact between the elements of the apparatus of FIG. 5 and an initially overcoated object and an initially undercoated object, respectively. FIG. 6a depicts part 6 overcoated with material 107 resulting in the actual surface level 105 forming a bulge over the previously formed layers of the part relatively to the desired working surface 103. Additionally, depressions in the surface 105 below the desired working surface 103 occur in regions of the building chamber away from the previously formed layers of the part. After leveling of the building medium 107 the working surface 103 and the actual surface 105 of the medium should be coincident, if the previous steps (not described here) of liquid leveling (matching of surfaces) was performed properly. This figure also depicts vibrating elements 104a–104o immersed into the building medium 126 to two different levels thereby following the vertical contours of the object more closely than a single level immersion and thereby more effectively coupling the vibrational energy to the building medium and inducing faster completion of the recoating process. FIG. 6b is similar to 6a except the part was not initially overcoated with material but instead was adjusted to be one layer thickness below the desired working surface 103 with the material needed to coat the upper surface of the part being located around the edges of the part. Vibration is used to enhance the flow of building material over the part, and thereby to decrease recoating time.

FIG. 7 depicts a preferred embodiment of a vibrational actuator in which the vibrational energy is imparted to the object via the platform 70 instead of directly to the untransformed building medium. The vibrated object in turn transmits the vibrational energy to the surface of the building medium surrounding the part, thereby increasing the relaxation rate of material over the part and decreasing the recoating time. This embodiment has several advantages over the previous one. These advantages involve the relative complexity of the mechanical apparatus of the previous one as compared to the present embodiment. Disadvantages of this approach include less coupling of vibrational energy to regions of building material that are far from the part, as well as the circumstance that transmitting vibrational energy through the part has the potential of damaging fragile regions of the part.

FIG. 7 depicts a mechanical vibrator 90 connected directly to a platform 70 upon which the part will be built. In the case of using a liquid building medium (e.g. liquid photopolymer) platform 70 could be driven in the vertical dimension by a Z-stage elevator 38. Since part 6 is directly attached to platform 70, vibrations are coupled to part 6 itself. Vibrator 90 is depicted as being capable of inducing vibrations along the Y-axis (left to right in FIG. 7). Other modes of vibration are also possible including vibrations along the vertical axis (i.e. Z-axis), along the other horizontal axis (i.e. X-axis, into and out of the page in FIG. 7), and combinations of these, and the like. The appropriate vibrational parameters can readily be determined by straightforward experimentation for a given set up. Apparatus for inducing these types of vibrations are known to those of skill in the art. The vibrations induced into the part cause a displacement of the part in the direction of the vibration. This can cause a misregistration of the part along this displaced axis between successive layers; therefore it is important that the vibration inducer allow (or induce) the part to return to the same position after vibration, as it was before vibration.

As described earlier there are several approaches to coat part 6 with a new layer of building material.

In particular, when using a liquid building material, the following are examples of such approaches. A first approach is "down dipping" part 6 a distance equal to one layer thickness below surface 103 and allowing gravity (and vibration) to spread the SLA resin. Vibration can be used to greatly influence the flow of material over the surface of the previously formed layer of structure; thereby greatly enhancing the effectiveness of this recoating style.

A second approach is "overdipping" part 6 well below desired working surface 103 of the building material and then bringing part 6 back up to one layer thickness below desired working surface 103. Partially completed part 6 is typically "overdipped" into the resin by an amount from 0.1 inch to 0.3 inches below working surface 103 at which point the liquid building material rapidly flows over the part to make a coating of excess thickness over the previously formed layer. It is possible to use vibration to enhance this coating process; however, it has usually been found to be unnecessary due to the large overdip used. Part 6 is next elevated to the point where the top surface 37 (the upper surface of the previous layer of structure formed) is located below surface 103 by the thickness of the next layer of structure to be formed. For example, such thicknesses typically 5 to 20 mils. When using this recoating method, vibration may be effectively used before, during and after the part is relocated to a position one layer thickness below the desired working surface.

Figure 12:
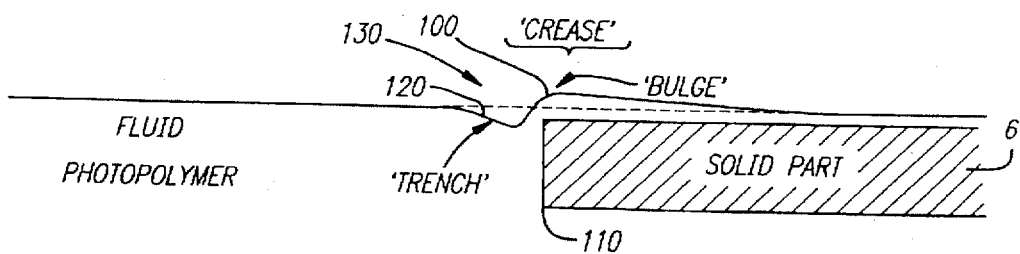
FIG. 12 is a schematic diagram depicting the "crease" problem that can result from some implementations of doctor blade assisted recoating.

A third approach is using a doctor blade (i.e. sweeping blade). As discussed earlier, the use of a doctor blade is discussed in a couple of previously herein-incorporated patent applications. Generally, the part is overdipped as with the previous approach followed by the part being raised some distance towards the desired working surface, and maybe even above the working surface. The blade is swept parallel to the desired working surface either at the surface or somewhat above it while the part is located a particular distance below the blade. One or more sweeps may be used with the final sweep being performed when the part is approximately one layer thickness below the blade. Upon lowering part 6 back into the liquid, (if necessary) vibration of the part or the liquid surface may be initiated thereby enhancing the reduction of any surface imperfections not removed by the blade or the reduction of surface imperfections induced by the use of a blade. For example, an induced imperfection called "creasing" can be corrected by vibration. Creasing is depicted in FIG. 12. Creasing occurs when the upper surface of partially completed part 6, is above the working surface after the last sweep is made and the part is subsequently lowered so that its upper surface is located one layer thickness below the desired working surface. For example, at the time of the final sweep, the upper surface may be located one layer thickness below a blade whose lower surface is 125 mils above the desired working surface. As part 6 moves down relative to the working surface, untransformed material at the edge of the part may be pulled down with the part resulting in the interface 120 being distorted from its desired flat shape. This distortion takes the form of untransformed material at the edge of the part being pulled down thereby forming a crease 130 on the fluid side of the part and a slight bulge 100 in the untransformed material over the edge of the upper surface of the part. Depending on the particular building material used this crease may not disappear for an excessive time period under the influence of gravity alone. Using a presently preferred liquid photopolymer (XB-5081), this crease may take well over one minute to disappear. As with the previous approaches, vibration can be used to greatly enhance the recoating process of this approach. Vibration may be used while the blade is sweeping or after the blade has completed its sweeps.

In particular when using a powder building medium, additional material is dispensed into the building chamber. It is desirable, as indicated earlier, that this dispensed material be in excess of that dictated by the volume of the successive layer to be created. After the dispensing of the material, it is desirable to ensure uniform distribution of it prior to any excess material removal process, compression process, or exposure process. This uniform distribution process can be greatly enhanced by vibration alone, or in combination with a doctor blade or rotating roller. After obtaining of a uniform coating, it is next desirable to remove the excess material. This removal can, again, be performed by vibration in combination with the sweeping devices above or by the sliding of a very thin horizontal cutting plate at the working surface or slightly above the working surface (if a later step of compression is to occur). If a compressive step is to occur next, vibration again can be useful to ensure uniform packing density as the particles are pushed together. Since a powder medium is generally capable of transmitting vibrational energy more effectively than a viscous liquid, vibration of the surface might be effectively achieved by vibrating the floor and/or walls of the chamber as well as the part itself. This approach also may be used with liquid materials. It has been experimently found to be effective in reducing crease effects. But, when using liquids, it has been found to be less effective than the other approaches described earlier. Since vibrational nodes can be formed at the working surface, which can cause buildup of excess particles at some locations, it is important that precautions be taken to avoid such occurrences. They can be avoided by varying the frequency of vibration or by other techniques known to those skilled in the art.

A preferred recoating technique of the present invention, for use with liquid building materials, is the use of over dipping, a doctor blade, and a mechanical vibrator coupled to an elevator platform. This combination may be employed as follows, with numeric values inserted only as examples. After forming the "n"th layer which has a top surface 37 shown in FIG. 7, part 6 is overdipped to about 100 to 300 mils (0.1 to 0.3 inches) beneath surface 103. After a predetermined duration, during which liquid leveling is occurring; elevator 38 lifts part 6 upward so that top surface 37 is moved to a known distance below the doctor blade. The positioning relative to the working surface 103 depends on the spacing of the doctor blade above the working surface and the desired blade gap between the blade and the upper surface of the part. For example, if the doctor blade is 25 mils above surface 103 and a 20 mil gap between the blade and the upper surface 37 is desired, part 6 is raised until top surface 37 is 5 mils above working surface 103. Next the blade is swept over the part at a particular velocity. This produces, to a greater or lesser extent, a 20 mil coating over the part. Optionally, several passes of the blade might be made with this separation to improve the coating remaining over the part. Optionally, before obtaining and sweeping at a part to blade separation equal to the desired layer thickness, staged sweeping might be performed to improve the coating formed. After sweeping is complete, elevator 38 lowers part 6 until top surface 37 is substantially one layer thickness below working surface 103. To perfect the coating over top surface 37, vibrator motor 90 is activated by a control computer to produce a specific form of vibration for a predetermined duration.

As discussed earlier, the position of the part must return to its initial position after vibration. The type and period of vibration is such that any surface imperfections are eliminated (including any creases at the part/liquid interface). The working surface 103 is then ready to be exposed to synergistic stimulation.

Figure 8:
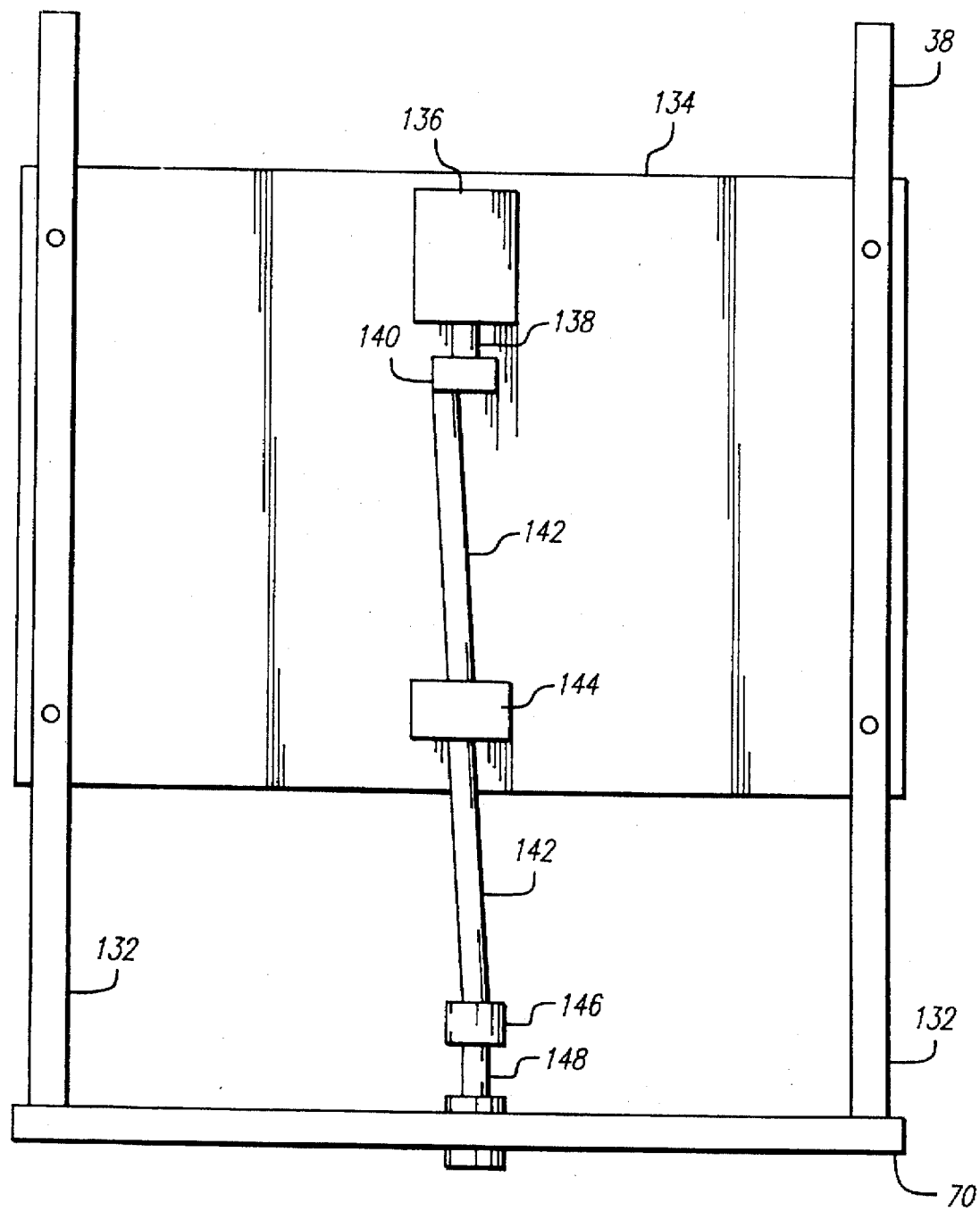
FIG. 8 is a schematic diagram depicting a variation on a vibrational actuator that vibrates the part.

FIG. 8 depicts an alternative embodiment of an actuator to induce vibrations into part 6. Part 6 is built on platform 70 which is supported by support arms 132. Attached to support arms 132 is mounting plate 134. Attached to mounting plate 134 is computer controlled motor 136. Motor 136 may be a stepper motor and it may be supplied with a rotatory encoder. As stated earlier, the platform 70 must be relocated to the same position after vibration as it was before vibration. Therefore, it is important that the angular orientation of shaft 138 be the same before and after vibration since it controls the position of platform 70. Additionally, one must avoid slippage of shaft linkages, backlash, and other mechanical errors. This position can be ensured by counting the number of steps induced and ensuring that they correspond to an integer number of full rotations or alternatively by using the rotational encoder to indicate exactly the angular position of the shaft, and using this information to in turn actuate rotation of the shaft until correspondence between initial and final positions is obtained. Alternatively, positive determination of platform position (and appropriate feedback) can be used to match initial and final positions. This is an especially useful approach if the problems mentioned above cannot be avoided. Shaft 138 is attached to the center of linkage 140, which in turn is attached off axis to shaft 142. Shaft 142 passes through fixed position bearing and mount 144 to swivel linkage 146. The amount that shaft 142 is attached off-axis to linkage 140 and the lengths of shaft 142 before and after mount 144 dictate the amplitude of the vibrations induced by motor 136 into part 6. If a variable amplitude apparatus is desired, mount 144 can be mounted so that it is vertically adjustable under computer control. Swivel linkage 146 allows the angular orientation of shaft 142 to change relative to vertical platform attachment 148 so that smooth rotation and controlled orbital vibration is achieved. The vibration actuator of this embodiment as with the previous embodiment occurs near the back edge of platform 70 out of the way of the part building region of platform 70 so that it may stay in place during exposure of the medium to synergistic stimulation. The rear of platform 70 is fixed into position by mounting attachment 143 while the front of platform 70 is fixed in position from each side by narrow pins so that platform 70 may oscillate back and forth and to the sides but will always return to the same position when shaft 138 is rotated to a particular orientation.

Figure 9:
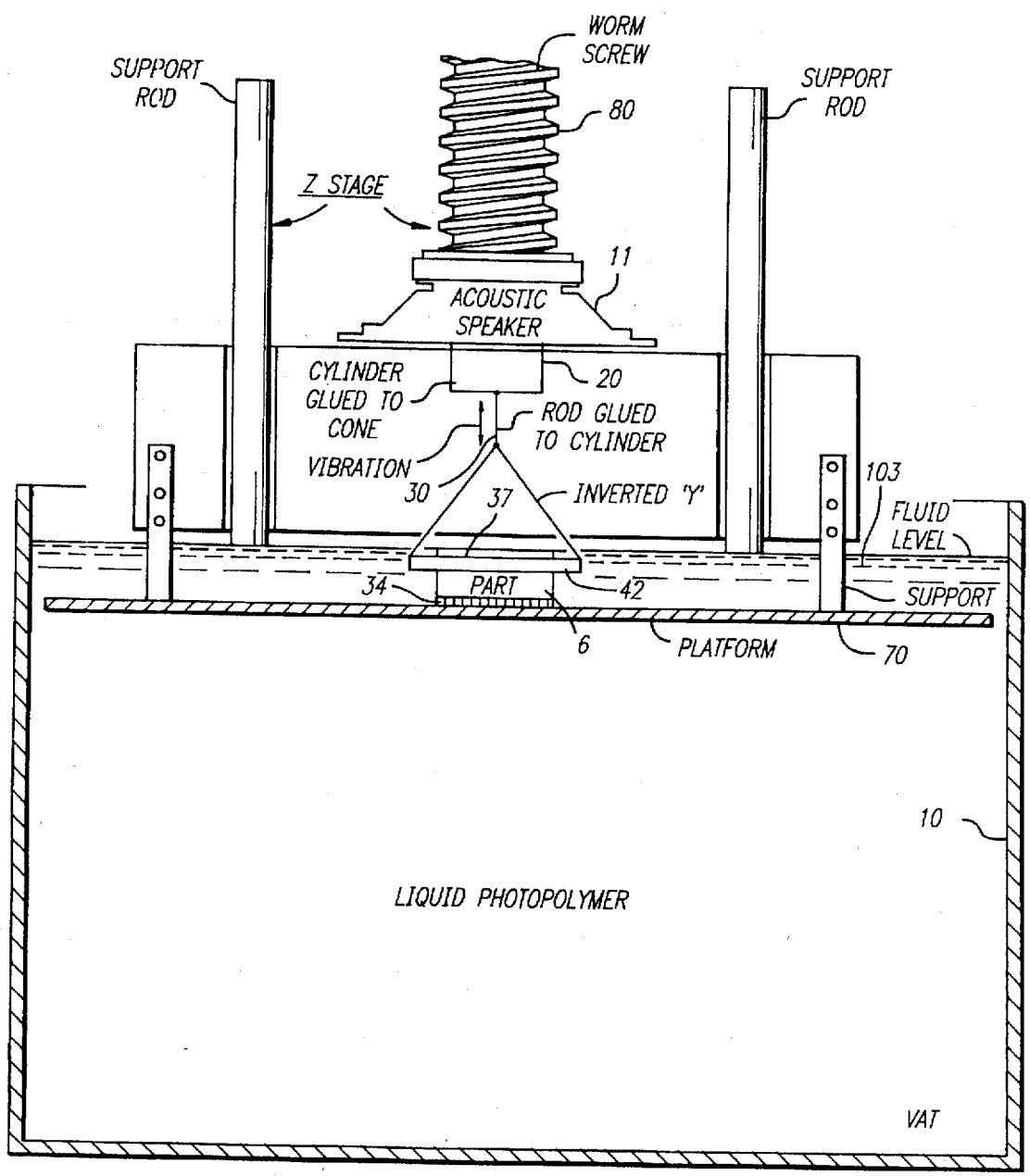
FIG. 9 is a schematic diagram of an additional apparatus of the present invention which was used to test the principles of the present invention.

FIG. 9 depicts another preferred apparatus of the present invention used in conjunction with a liquid photopolymer building material. The optimum vibrational parameters for minimizing recoating time of this apparatus were determined. Referring to the figure, vat 10 of SLA 15 is filled with liquid photopolymer resin. An exemplary resin is XB5081 manufactured by Ciba-Geigy, Ltd., of Basel, Switzerland. Photopolymers are subject to solidification upon exposure to synergistic stimulation. Various forms of synergistic stimulation can be used depending on the photoactivator in the resin. Various forms of synergistic stimulation are described in U.S. Pat. No. 4,575,330. The XB5081 resin, mentioned above, is typically solidified by a HeCd laser emitting a beam of 325 nm radiation.

Part 6 as shown in FIG. 9 is a partially completed SLA part. It is resting on supports 34 which in turn rest on platform 70 within vat 10. As can be seen, upper part surface 37 is tangent to fluid level, working surface, 103 and is substantially at the same level. Upper part surface 37 corresponds to the top of the "n"th layer fabricated pursuant to the stereolithography process.

In order to fabricate the "n+1"th layer of part 6, it is necessary to recoat upper part surface 37 with SLA resin of uniform thickness.

FIG. 9 shows part 6 on platform 70 supported by an elevator 38 which is capable of raising and lowering platform 70 in precise measured amounts under suitable computer control. Examples of such mechanisms are disclosed in U.S. Pat. No. 4,575,330 and U.S. Pat. No. 5,184,307. Additionally this second referenced patent contains many details on the overall stereolithography apparatus and is incorporated by this reference as if set forth herein in full.

Accordingly, it is necessary to cover part 6 with a fluid layer having a desired thickness above upper part surface 37. Presently preferred photopolymers are problematic because they are very viscous and slow-flowing. This problem is greatly ameliorated by vibrating the liquid resin at and near the "working surface" of the building medium from which the part is being formed.

As discussed earlier, quick recoating generally requires that the viscous resin flow quickly. In the apparatus shown in FIG. 9, speaker 10 is connected via cylinder 20 to rod 30. Rod 30 is formed in an inverted "Y" shape and is attached to fence 42. Fence 42 is a ring which surrounds part 6. In this way, vibrations from speaker 10 are transmitted to cone 20, to rod 30, to fence 42, and finally, to the liquid resin near part 6. Due to imparting of vibrational energy, resin near part 6 flows more quickly and so recoating time is lessened. Speaker 10 is driven by a source that can vary the frequency, amplitude, form, and duration of the vibrational signal. These variables are changeable sequentially or simultaneously.

Figure 10:
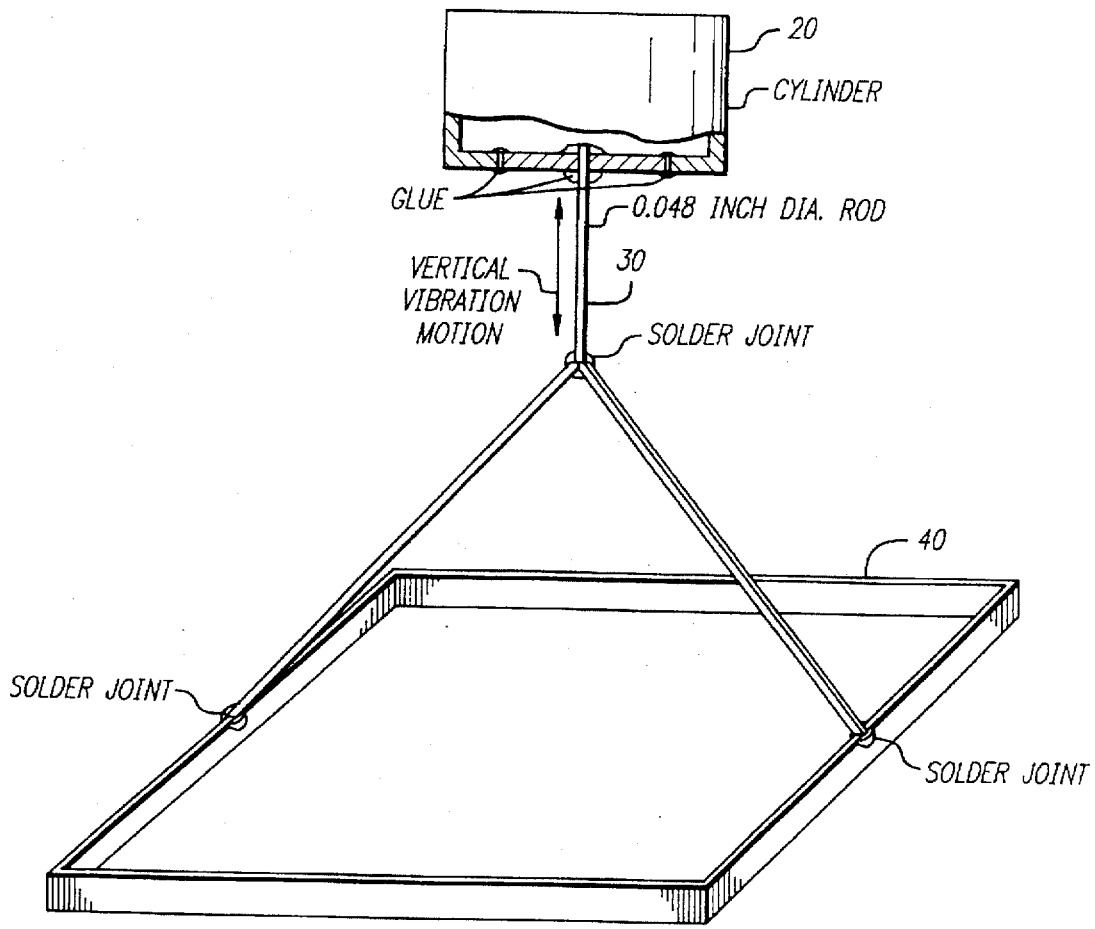
FIG. 10 is a schematic diagram showing the portion of the apparatus of FIG. 9 that makes contact with and induces the vibration into the building medium.

FIG. 10 shows the inverted Y-shaped member rod 30, cylinder 20, and ring (fence) 42 of FIG. 9 in greater detail. The lower portion of fence 42 is located below the fluid surface 103, while it upper surface extends above surface 103, while surrounding part 6. Part 6 itself rests upon platform 35 which can be raised and lowered by elevator 38. The fence 42 can be translated vertically due to its attachment to speaker 10 together with cylinder 20, and rod 30 being mounted to computer driven worm screw drive 80. Limitations of this "vibrating fence" approach relate to the damping of the vibrational energy within the viscous photopolymeric resin. The effect of the vibration in the fluid is generally damped-out close to the fence, for example in one experiment substantially damping occurred within about 0.5 inches from the fence. Therefore, the fence is best placed rather close to the part/fluid interface for effective enhancement. As a result, the effectiveness of the vibration is very part-geometry dependent. Interior interfaces also pose somewhat of a problem for this embodiment because such interfaces surround resin that is not as close to the fence as is the resin at the outer edges of the part. Additionally the above gives a good indication has to how far apart to place the needle or line probes to get effective enhancement.

Alternatively, as discussed earlier, improved effectiveness of vibration as a method for reducing the relaxation time and to ensure that vibration is effective at every element of fluid/solid interface, it is possible to vibrate the part directly rather than the fluid. Since the part is solid, the vibration does not damp out significantly throughout the solid part. Resonance frequencies need to be avoided which might damage the part.

Figure 11:
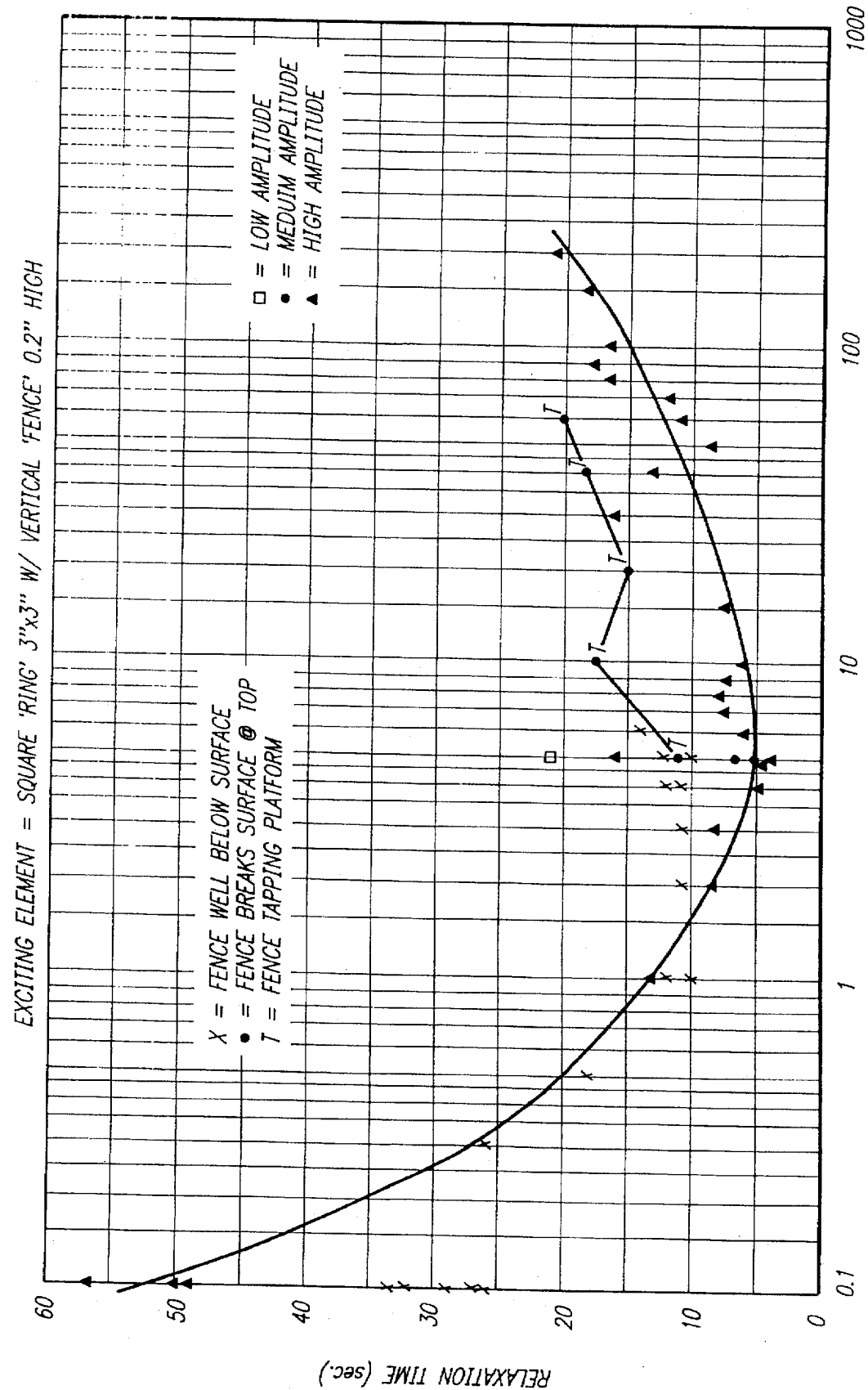
FIG. 11 is a plot of experimental data obtained by the use of the apparatus of FIGS. 9 and 10.

FIG. 11 shows test data using the overdip recoating method in combination with the vibration apparatus of FIGS. 9 and 10 at low (≈1 mm), medium (≈2–3 mm) and high (≈5 mm) amplitudes, while plotting relaxation time as a function of the driving vibration frequency. For this test, a commercially available 10 watt Realistic Model 40-1909B acoustic speaker 11 is connected via cylinder 20 to a rod 30, which is formed in an inverted "Y" ("Y-shaped member") and soldered to a 3 inch×3 inch square "ring" 40 with a vertical fence 0.2 inch high. Speaker 10 was excited with a standard sine wave signal generator having adjustable frequency and amplitude (not shown). The part used was built with 10 mil layers and was a rectangular box of horizontal dimensions 2.00 by 2.00 inches. The part was built up to a particular height by overdip and gravity reduction coating methods. It was then run through a series of coating processes to determine relaxation time versus gravity leveling and various vibrational approaches to enhancement. It was observed that without induced vibration the relaxation time of surface 40 was almost 1 minute. The surface relaxation time was reduced by induced vibration. As seen in FIG. 4, the minimum time was about 4–5 seconds at a frequency of about 8 Hz with the fence breaking the surface of the resin and with medium or high amplitude. As shown in FIG. 11, frequencies from about 0.5 Hz to over 300 Hz were also effective at reducing the recoating time by better than approximately ⅔. These particular frequencies are only quoted as the result of a particular experiment. They are not meant to encompasses the range of effective frequencies for this invention. The appropriate frequencies for a given resin and apparatus will be readily determinable by one of skill in the art by means of simple experimentation or experience. In fact, experiments with single line probes and needle probes gave optimal results at about 300 to 500 Hz. For a part similar to that used above, the relaxation time was reduced from greater than two seconds to between 10 and 20 seconds. From this plot it is apparent that externally applied vibration of the proper amplitude and frequency materially enhances stereolithographic recoating. Additionally, the plot contains a curve that indicates vibration transmitted from the platform to the part and then the resin surface is also an effective way of enhancing the recoating process.

Additionally, experimental results obtained from the orbital vibration actuator depicted in figure B also confirm the utility of vibration in enhancing the recoating process. This apparatus was used in combination with a liquid photopolymer, overcoating, a large area (6" by 6") flat part, 5 mil layers, and a doctor blade. When a doctor blade sweeps across the surface of the resin, it may have resin wicked up on to both sides of the blade. When the blade encounters the leading edge of the part, the material wicked up on the back side of the blade can be torn from the blade and deposited on the part. This material forms a bulge over the first encountered edge of the part known as "leading edge hump." The relaxation time of the leading edge hump was measured with and without vibration. The relaxation time of the leading edge hump was significantly reduced by short duration (e.g. 2 to 10 seconds), high amplitude (e.g. 25–35 mils peak to peak), circular X-Y, low frequency (e.g. 1–14 Hz) vibrations. In one case the leading edge hump was reduced from approximately 5 mils to under 1 mil within 2 seconds of vibration at 5 Hz. Without vibration, the relaxation time to go from 5 mils to under 1 mil exceeded 5 to 10 minutes. It was found, if sufficient overcure was used to ensure adequate adhesion, a one mil excess deviation between actual surface and desired working surface would not build up from layer to layer. Therefore, with the above embodiment vibration can be used to substantially reduce relaxation time. The actual vibration parameters that give optimal results in a given situation can be directly determined by straightforward experimentation.

As an additional embodiment of a vibrational actuator, it is possible to vibrate the entire building vat for materials that allow the energy to be effectively coupled to the working surface around the part. Additionally, vibrational energy may be coupled to the working surface through a doctor blade or a rotating roller.

An additional form of vibration that has been observed to enhance surface relaxation, is one or more impulsive wave forms applied to the building structure. Impulses applied to the arms supporting the building platform have been observed to decrease the time required to break creases and other surface imperfections.

Accordingly, various methods and systems have been disclosed for enhancing the recoating processes and for decreasing the time necessary to carry out stereolithographic recoating. From the previous disclosure it is apparent that vibration can be used effectively to enhance stereolithographic recoating when using a variety of building mediums, vibrational techniques, and basic recoating techniques. The most preferred combination of techniques are overcoating combined with the use of a doctor blade and vibration induced by a needle probe apparatus. It is apparent that any recoating method that depends on gravity leveling, or the like, to remove imperfections in the working surface can be enhanced by the methods and apparatus of this invention. While embodiments and applications of this invention have been shown and described, it would be apparent to those of skill in the art that many more modifications are possible without departing from the inventive concepts herein.

We claim:

1. A method for recoating a previous layer of a part having an upper surface comprising the steps of:
  (1) coating the upper surface of the part with liquid building material to form an upper coat; and
  (2) inducing vibration in the upper coat, wherein said step (1) is comprised of the substep of:
    (a) lowering the part having an upper surface in a vat of liquid material by a distance approximately equal to a desired layer thickness.

2. A method for recoating a previous layer of a part having an upper surface comprising the steps of:
  (1) coating the upper surface of the part with liquid building material to form an upper coat; and
  (2) inducing vibration in the upper coat, wherein said step (1) is comprised of the substeps of:
    (a) over-dipping the part; and
    (b) locating the part in a position in which the upper surface is below a working surface by a distance substantially equal to a desired layer thickness.

3. A method for recoating a previous layer of a part having an upper surface comprising the steps of:
  (1) coating the upper surface of the part with liquid building material to form an upper coat; and
  (2) inducing vibration in the upper coat, wherein said step (2) is comprised of the substeps of:
    (a) providing a vibration generator;
    (b) providing a physical coupling between said vibration generator and liquid building material;
    (c) causing said vibration generator to vibrate liquid building material.

4. The method of claim 3 further comprising vibrating through a speaker at a frequency between 0.5 Hertz and 300 Hertz in substep (c).

5. The method of claim 3 further comprising transmitting vibration through the part to the liquid material.

6. A method of recoating a previous layer of a part comprising the steps of:
  applying excess liquid building material over a substantial portion of the previous layer of said part, wherein the liquid building material has an actual material surface locatable at a desired working surface;
  locating an upper portion of the previous layer approximately one layer thickness below the working surface; and
  applying vibration to the excess liquid building material to aid in locating the actual surface of the material at the working surface.

7. The method of claim 6 wherein said material application step comprises overdipping said part.

8. The method of claim 6 wherein said material application step comprises adding liquid material to a building chamber.

9. The method of claim 6 wherein said vibration application step comprises applying vibration to said part.

10. A method of recoating a previous layer of a part, having an upper portion, wherein the previous layer is formed from a liquid building material having an upper surface locatable at a desired working surface, and wherein the upper portion is at the desired working surface comprising the steps of:
  separating the desired working surface and the upper portion of the previous layer by substantially a desired layer thickness; and
  vibrating and flowing liquid building material over said upper portion.

11. The method of claim 10 wherein said separating step comprises downdipping.

12. The method of claim 10 wherein said separating step comprises increasing the material level in a building chamber.

13. The method of claim 10 wherein said flowing comprises gravity leveling.

14. The method of claim 10 wherein said flowing comprises blade sweeping.

15. The method of claim 10 wherein said vibrating comprises applying vibration to said part.

16. The method of claim 15 wherein said vibrating comprises vibrating a platform upon which said part is being fabricated and further comprising the additional step of relocating said platform to the same position after said vibrating as before said vibrating.

17. A method for forming a three-dimensional object comprising the steps of:
  maintaining a container of liquid building material that has an actual material surface which is an upper surface and which is locatable at a desired working surface;
  forming a first layer of structure having an upper surface at the actual material surface when the actual material surface is substantially at the desired working surface;
  separating the upper surface of the first layer of structure from the desired working surface;
  inducing vibration into the liquid building material to aid formation of a substantially uniform coating of material having an upper surface over said first layer of structure and having a thickness substantially equal to the desired layer thickness;
  selectively exposing the uniform coating of material to synergistic stimulation to form a second layer of structure integral with said first layer of structure; and
  repeating the separating and exposing steps to form said object from a plurality of integral layers of structure.

18. The method of claim 17, where the building material is a liquid photopolymer.

19. The method of claim 18, where the synergistic stimulation is ultra-violet radiation.

20. The method of claim 17, where the synergistic stimulation is infrared radiation.

21. The method of claim 19, where the synergistic stimulation is a laser.

22. The method of claim 18, where the desired working surface is at a fixed location in the container.

23. A method for coating a previous layer of structure of a three-dimensional object with liquid building material comprising:
  forming a coating of said liquid building material over the previous layer of structure; and
  inducing vibrational energy into the liquid building material to form the coating of liquid building material into a uniform coating of thickness substantially equal to that of a layer thickness,
  where the coating of said building material over the previous layer of structure is a coating of excess material over a substantial portion of the previous layer of structure and where the excess coating is obtained by overdipping the previous layer of structure into a container of said building material and then positioning an upper surface of the previous layer of structure subtantially one layer thickness below a desired working surface.

24. The method of claim 17 where vibration is induced into the building material by vibrating an object support platform with the vibrational energy being transmitted, at least in part, through the object to the actual material surface of the building material.

25. The method of claim 17 where vibration is induced into the building material by contact between a vibrating element and the building material.

26. A method for recoating a previous layer of a part having an upper surface comprising the steps of:
  coating the upper surface of the previous layer with liquid building material to form an upper coat; and
  inducing vibration in the upper coat; wherein inducing vibration further comprises the steps of:
  providing a vibration generator;
  providing a physical coupling between said vibration generator and the liquid building material; and
  causing said vibration generator to vibrate the upper coat.

27. A method of recoating a previous layer of a part, formed from a fluid-like material having an upper surface which is locatable at a desired working surface, comprising the steps of:
  separating the desired working surface and an upper portion of a previous layer by substantially a desired layer thickness; and
  vibrating and flowing fluid-like material over said upper portion, wherein said vibrating comprises applying vibration to said part.

28. The method of claim 27 wherein said vibrating comprises vibrating a platform upon which said part is being fabricated and further comprising the additional step of relocating said platform to the same position after said vibrating as before said vibrating.

29. The method as claimed in claim 27 wherein the fluid-like material is a sinterable powder.

30. The method of claim 27 wherein the fluid-like material is a powder that can be solidified by the addition of a binder.

31. A method for forming a three-dimensional object comprising the steps of:
  maintaining a container of liquid building material that has an actual material surface which is an upper surface and which is locatable at a desired working surface, wherein the desired working surface is substantially fixed in a vertical plane;
  forming a first layer of structure having an upper surface at the actual material surface when the actual material surface is substantially at the desired working surface;
  separating the upper surface of the first layer of structure from the desired working surface;
  inducing vibration into the liquid building material to aid formation of a substantially uniform coating of material having an upper surface over said first layer of structure and having a thickness substantially equal to the desired layer thickness;
  selectively exposing the substantially uniform coating of material to synergistic stimulation to form a second layer of structure integral with said first layer of structure; and
  repeating the separating and exposing steps to form said object from a plurality of integral layers of structure.

32. A method for forming, layer by layer, a three-dimensional object comprising the steps of:
  forming a layer of a liquid building material, wherein forming the layer includes inducing vibration into the building material to aid formation of a substantially uniform layer of material;
  selectively solidifying the layer of building material; and
  repeating the steps of forming the layer and solidifying the layer until the three-dimensional object is formed.

* * * * *